(12) United States Patent
Draxton et al.

(10) Patent No.: US 6,834,992 B2
(45) Date of Patent: Dec. 28, 2004

(54) ACOUSTIC PYROMETER

(75) Inventors: Dean E. Draxton, Park City, UT (US); James G. Droppo, III, Mountlake Terrace, WA (US); Richard E. Hogle, Olympia, WA (US); George Kychakoff, Maple Valley, WA (US)

(73) Assignee: Combustion Specialists, Inc., Maple Valley, WA (US)

( * ) Notice: Subject to any disclaimer, the term of this patent is extended or adjusted under 35 U.S.C. 154(b) by 0 days.

(21) Appl. No.: 10/657,460

(22) Filed: Sep. 8, 2003

(65) Prior Publication Data

US 2004/0052295 A1 Mar. 18, 2004

Related U.S. Application Data

(62) Division of application No. 10/020,106, filed on Dec. 14, 2001, which is a continuation of application No. 09/462,325, filed as application No. PCT/US98/13839 on Jan. 5, 2000, now Pat. No. 6,386,755.
(60) Provisional application No. 60/052,930, filed on Jul. 5, 1997.

(51) Int. Cl.$^7$ .............................................. G01K 11/22
(52) U.S. Cl. ....................... 374/115; 374/117; 374/118; 181/142; 367/140
(58) Field of Search ........................ 374/115, 117–119; 702/130; 73/662, 671; 181/116–117, 121, 142; 367/144–145, 82–83, 30, 48, 57, 35, 140, 100, 127

(56) References Cited

U.S. PATENT DOCUMENTS

| | | | | |
|---|---|---|---|---|
| 3,672,300 A | * | 6/1972 | Axelson et al. ............. | 181/142 |
| 4,030,063 A | * | 6/1977 | Wallen ........................ | 367/143 |
| 5,850,369 A | * | 12/1998 | Rorden et al. ................ | 367/83 |
| 6,208,586 B1 | * | 3/2001 | Rorden et al. ................ | 367/35 |

* cited by examiner

*Primary Examiner*—Christopher W. Fulton
*Assistant Examiner*—Yaritza Guadalupe
(74) *Attorney, Agent, or Firm*—J. Michael Neary

(57) ABSTRACT

An acoustic pyrometer measures the average gas temperature across a wide space of known distance, especially turbulent, high temperature gas loaded with caustic particulates. It includes an acoustic signal generator that generates a high amplitude acoustic signal with a short rise time and a detector positioned adjacent the signal generator that detects the onset of the acoustic signal in the signal generator and generates a first electrical signal corresponding in time to the onset of the acoustic signal in the signal generator. A receiver, positioned across the space from the signal generator, receives acoustic signals from the space and generates electrical signals corresponding to amplitude and frequency of the acoustic signals received in the receiver. A signal processor processes the electrical signals from the receiver to distinguish the onset of the acoustic signal from background noise in the space as detected in the receiver, and processes the electrical signals from the receiver to produce a distinct differentiation between background noise and the onset of the acoustic signal in the receiver. The signal processor then compares the time of the onset of the acoustic signal in the receiver with the onset of the acoustic signal in the signal generator to determine the transit time of the acoustic signal to traverse the space, and also calculates the temperature of the gas in the space based on the transit time.

7 Claims, 24 Drawing Sheets

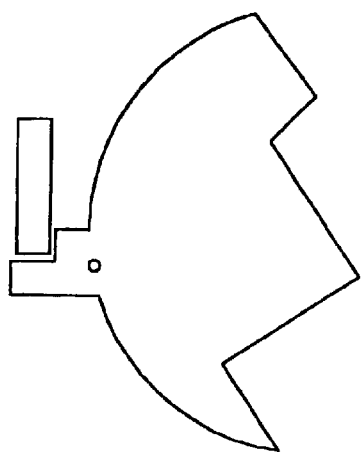
Fig. 17
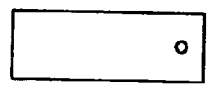
Fig. 13
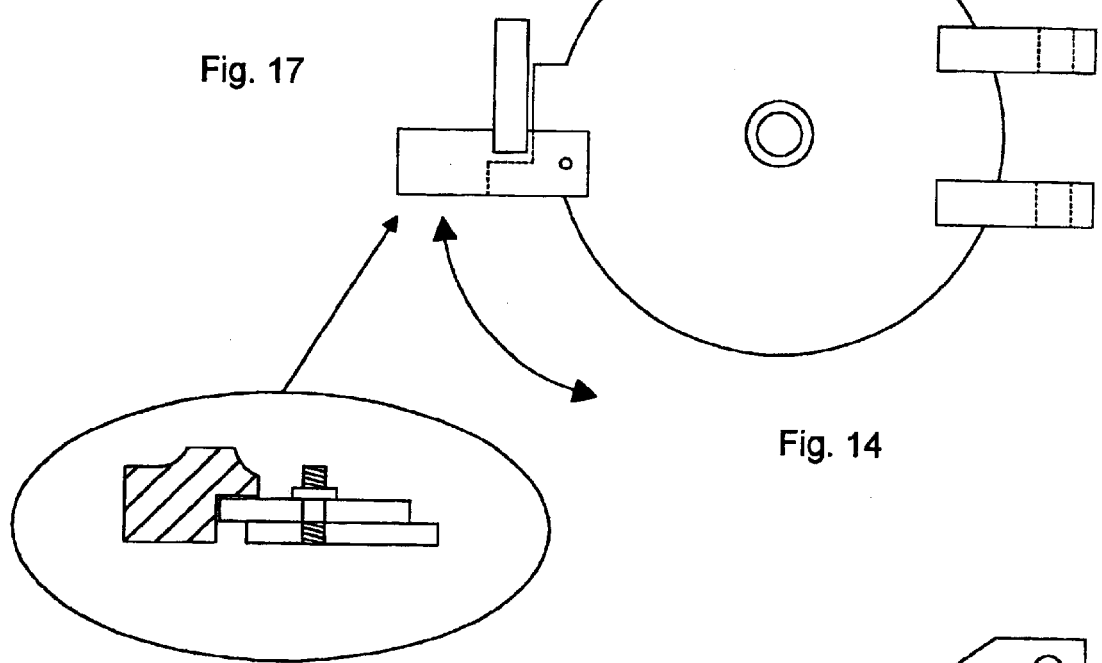
Fig. 14
Fig. 16
Fig. 15

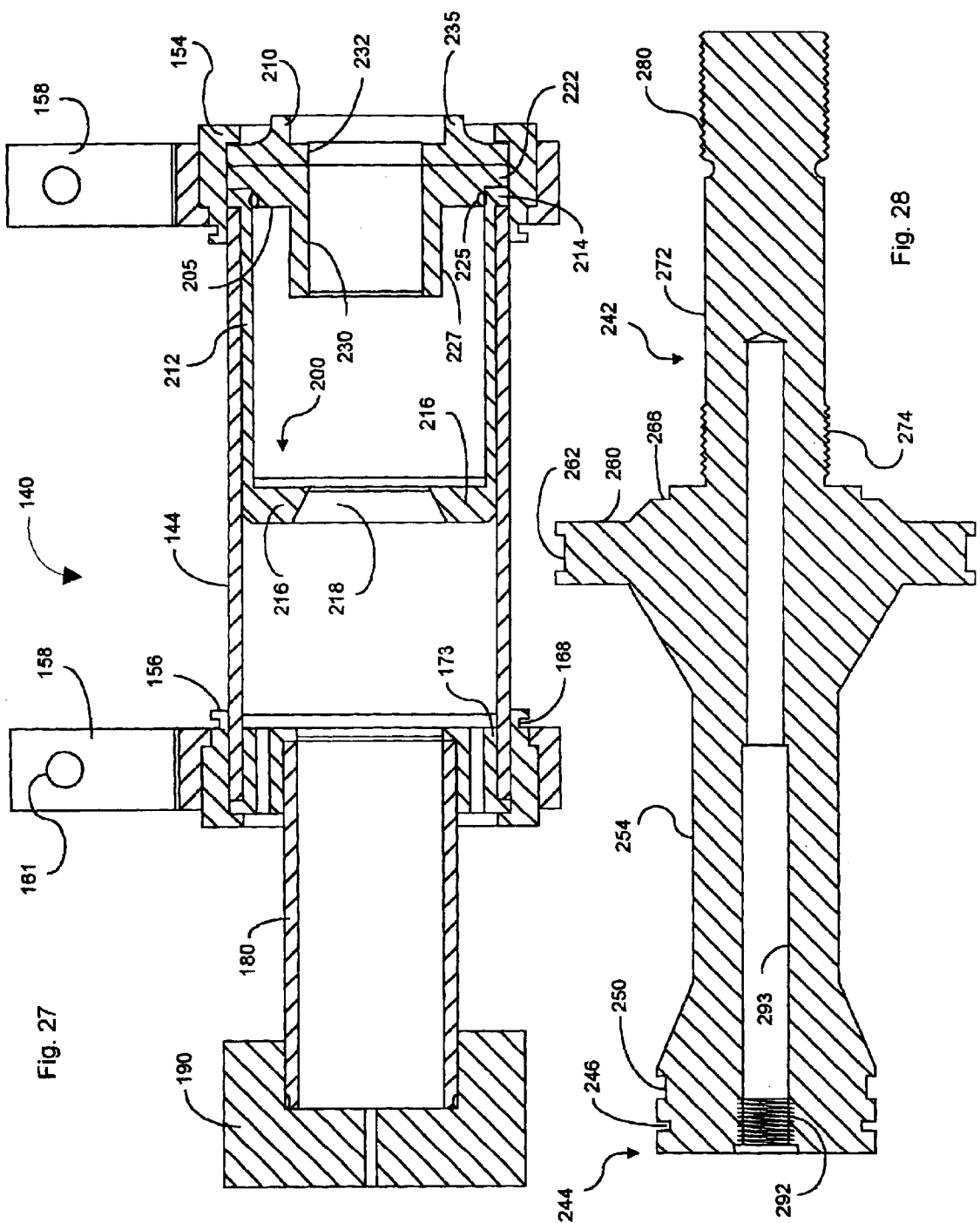

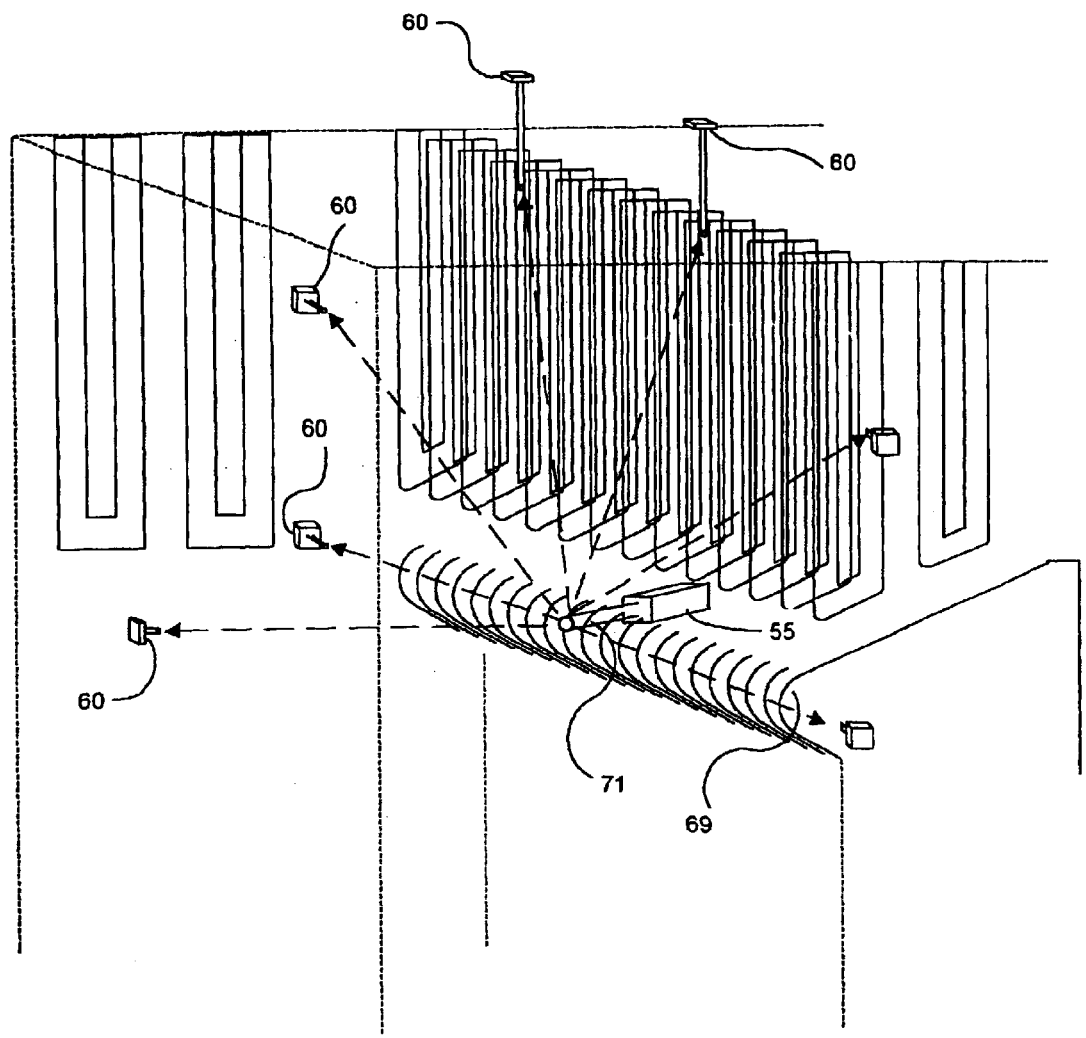
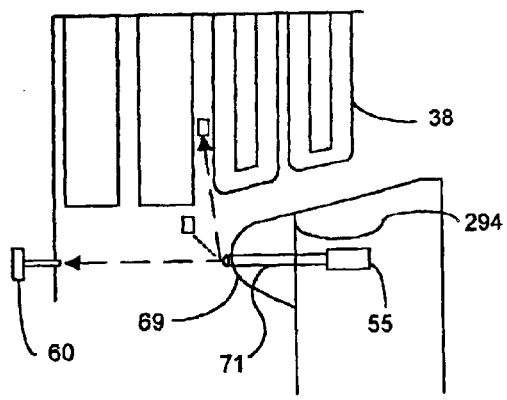
Fig. 34
Fig. 35

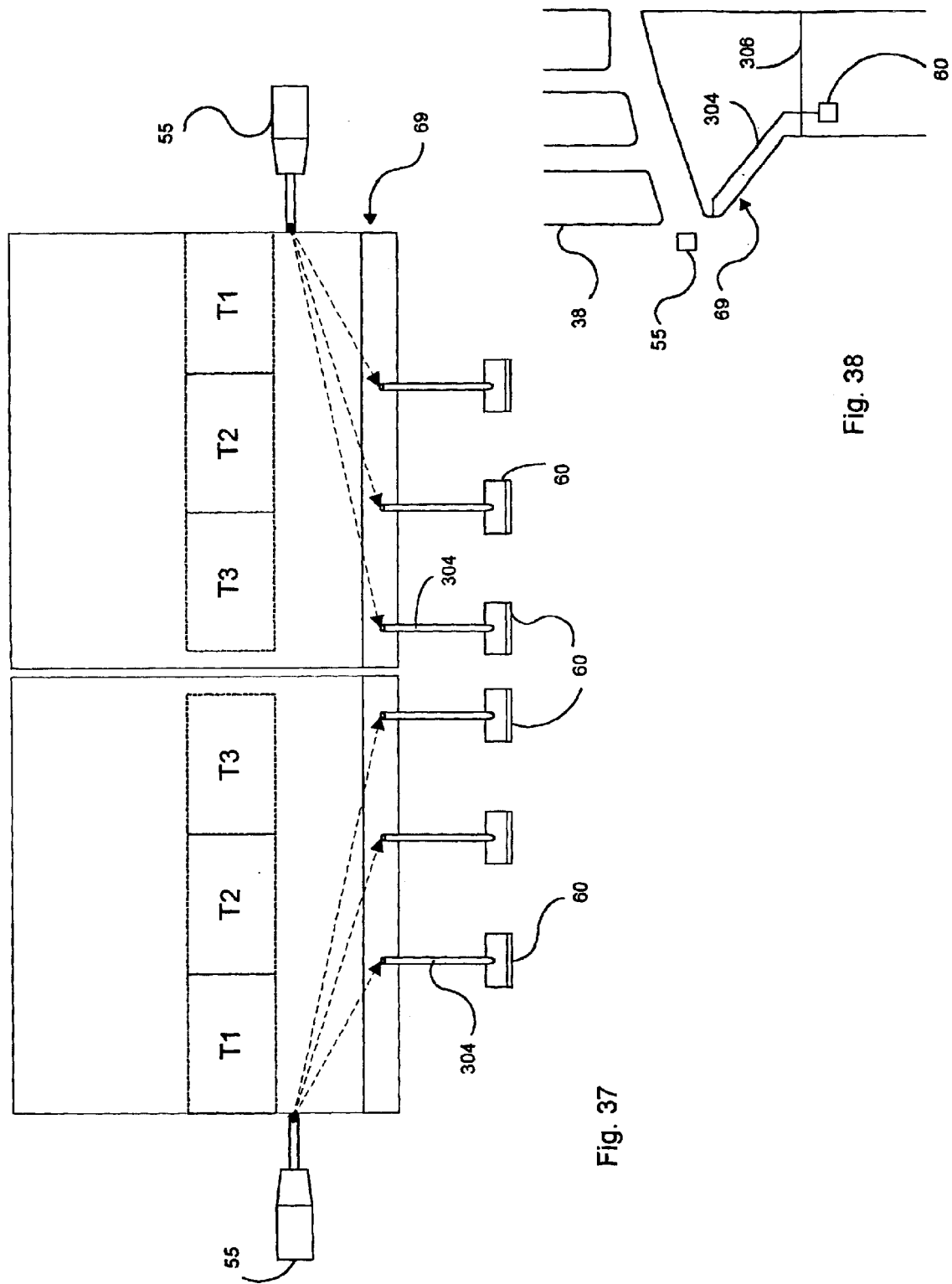

ACOUSTIC PYROMETER

This application is a Divisional of application Ser. No. 10/020,106 filed Dec. 14, 2001, which is a Continuation of Ser. No. 09/462,325, now U.S. Pat. No. 6,386,755, filed on Jan. 5, 2000, which is a 371 of PCT/US98/13839 filed on Jul. 4, 1998, which claims benefit of 60/052,930 filed on Jul. 5, 1997.

This invention pertains to temperature measurement, and more particularly to measurement of temperatures across large spaces of known distance in a noisy, dirty and corrosive environment such as a coal-fired utility boiler, or a chemical recovery boiler.

BACKGROUND OF THE INVENTION

Coal-fired boiler operations are significantly influenced by operational parameters that vary with changing environmental factors, including ambient temperature, humidity, coal composition, etc. Gas temperatures in the boiler, including furnace exit gas temperatures, are influenced by these factors, as well as by adjustments that can be made to the furnace apparatus, such as burner configuration and orientation, air flow rate, coal feed rate, etc.

Gas temperatures profoundly affect the performance of a boiler in several ways. The thermal $NO_x$ formation rate increases exponentially at temperatures over 2700° F. There is strong regulatory pressure to reduce $NO_x$ emissions, but the fundamental knowledge of furnace exit gas temperatures, the primary factor in $NO_x$ formation, is lacking in large boilers because existing temperature measurement technology is incapable of producing accurate temperature data in large boilers.

Boiler gas temperatures also influence slag formation rates on boiler tubes. Slag is an accumulated deposit of materials present in coal that are formed as ash particles when the coal is burned in the furnace but which impinge and stick on the pendant steam/water tubes when the gas temperature is near the fusion temperature of the ash particles (the so-called "sticky zone"). Slagging of the tubes is a common phenomenon in all coal fired boilers, but is particularly troublesome in those boilers using sub-bituminous coal such as the low sulfur coal from the huge deposits in the Power River Basin. Slag is a problem because it interferes with heat transfer to the boiler tubes, and can impede gas movement through the tube banks. Even more serious, slag deposits can grow to enormous size and then fall, causing extensive damage to the boiler and resulting in expensive boiler down-time while repairs are made.

Boiler tubes are cleaned of slag deposits by "soot blowing" blasts of steam injected through vents in rotating pipes, but the frequency and location of the soot blowing is based primarily on guesswork by the operator rather than a real knowledge of the actual current conditions in the boiler that produce slagging of the boiler tubes. Soot blowing reduces the efficiency of the boiler and can itself cause erosion of the tubes, so there is a strong incentive to optimize the soot blowing operation, that is, to operate it only with the necessary frequency, duration and location. One technique to determine when the tubes are becoming slagged is by measuring the temperature on opposite sides of a bank of tubes to ascertain how much heat is being transferred through the tubes to the water/steam in the tubes. When the temperature differential drops, that is an indication that the tubes are becoming slagged since the slag acts as an insulator, retarding the heat transfer. However, there must be an accurate measure of the gas temperatures on opposite sides of the tube banks for the temperature differential scheme to work, and state of the art temperature measurement techniques are inaccurate or short lived for large boiler installations.

A better approach to the slagging problem would be to minimize the formation of slag and thereby reduce the need to remove it. Since slag formation is influenced by gas temperature, a knowledge of the temperatures at the inlet plane to the tube bank, and/or in the tube bank itself would enable the boiler operator to determine when the thermal conditions are approaching those under which tubes are likely to become slagged. Control of gas temperature to prevent the creation of the "sticky" zone of slag formation would help to delay the onset of boiler pluggage and forced shutdown for cleaning. Detailed knowledge of the thermal conditions in the region of the tube bank can be helpful, not only in assessing where slagging is likely to occur, so that soot blowing may be optimized for the conditions, but also can be used in adjusting the furnace to produce gas temperatures which minimize slagging.

Thus, there has long been a need for accurate temperature measurements in large power and recovery boilers that enable improvements to be made in boiler efficiency, and also reduce the formation of slag and optimize soot blowing to remove slag that does form so that large slag deposits do not form and cause boiler damage from slag falls. The temperature measurement would also be useful in minimizing $NO_x$ formation by reducing the dwell time at high temperature. Finally, such a temperature measurement would facilitate furnace fireball centering, firewall flame impingement detection, and tube leak detection.

The long felt need for accurate temperature measurement in large boilers exists because the prior art measurement techniques are inadequate to reliably produce accurate temperature measurement across the width of large boilers. Thermocouple probes are unreliable and fail quickly in corrosive environments. Optical methods have limited penetration and are difficult to interpret. Prior acoustic methods cannot operate accurately over large spans in noisy environments, in part because they are unable to accurately detect the onset of the acoustic signal in high amplitude background noise.

SUMMARY OF THE INVENTION

Accordingly, it is an object of this invention to provide an improved acoustic pyrometer that can make accurate measurements of elevated gas temperatures across wide spaces in the presence of substantial acoustic noise. Another object of this invention is to provide an improved acoustic pyrometer capable of accurate operation in atmospheric conditions wherein the path length before absorption of optical wavelengths used in optical pyrometry are short and optical pyrometry is difficult to interpret. It is another object of this invention to provide an improved acoustic pyrometer having the capability of performing advanced diagnostic functions regarding the internal operation of a boiler, e.g. to facilitate optimal furnace adjustment for fireball centering, firewall flame impingement detection. It is yet another object of this invention to provide improved methods for measurement of heat transfer to boiler tubes, tube leak detection, localization of slag-formation regions, furnace plane temperature mapping, and optimizing soot blowing operations.

These and other objects of the invention are attained in an improved acoustic pyrometer for measuring the average gas temperature across an open space of a known distance. It includes an acoustic signal generator for generating an acoustic signal with a high amplitude sudden onset or short rise time. A detector is positioned adjacent the signal generator in a position to detect the onset of the acoustic signal in the signal generator. The detector could be an acoustic signal detector such as a microphone or a piezo-electric detector, or it could be a proximity or translation detector that senses the movement of the signal generator component that releases the acoustic signal. The detector generates a first electrical signal corresponding in time to the onset of the acoustic signal in the signal generator. A receiver is positioned across the space of known distance from the signal generator, and has a microphone or other acoustic signal sensor for receiving acoustic signals from the space and for generating electrical signals corresponding to amplitude and frequency of the acoustic signals received in the receiver. The signals from the acoustic signal detector associated with the signal generator and the acoustic signal sensor in the receiver are sent to a signal processor, to distinguish the acoustic signal from background noise in the space as detected in the receiver, and for comparing the time of arrival of the acoustic signal in the receiver with the time when the acoustic signal was generated in the signal generator to determine the transit time of the acoustic signal to traverse the space, and for calculating the temperature of the gas in the space based on the transit time.

DESCRIPTION OF THE DRAWINGS

The invention and its many attendant objects and advantages will become better understood upon reading the following detailed description of the preferred embodiments in conjunction with the following drawings, wherein:

FIGS. 13–17 are assorted views of modified view port elements used for mounting the signal generator shown in FIG. 12 to a view port of a boiler in accordance with this invention

FIG. 27 is a sectional elevation of the signal generator shown in FIG. 26 with the shaft/piston removed;

FIG. 28 is a sectional elevation of the integral piston/shaft shown in FIG. 26, with all components removed for clarity of illustration;

FIGS. 34–38 are schematic views of boilers showing several specialized functions that can be performed by an acoustic pyrometer in accordance with this invention.

DESCRIPTION OF THE PREFERRED EMBODIMENTS

Figure 2:
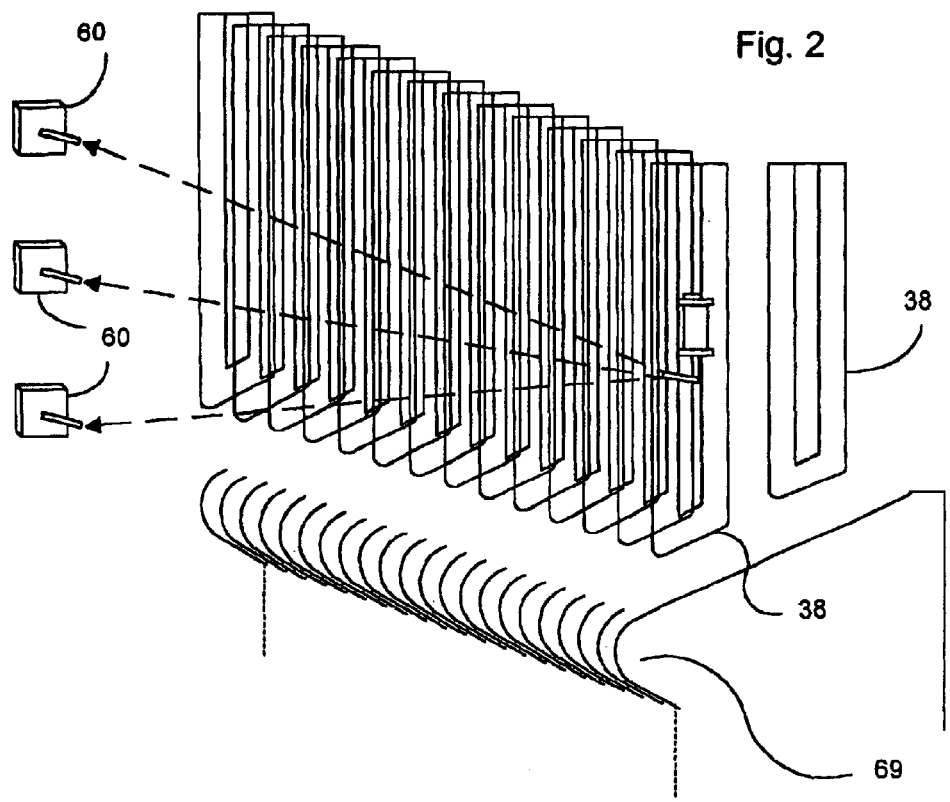
FIG. 2 is a perspective view of a signal generator of the acoustic pyrometer of this invention shown in FIG. 1, mounted on a tube wall of a boiler.
Figure 1:
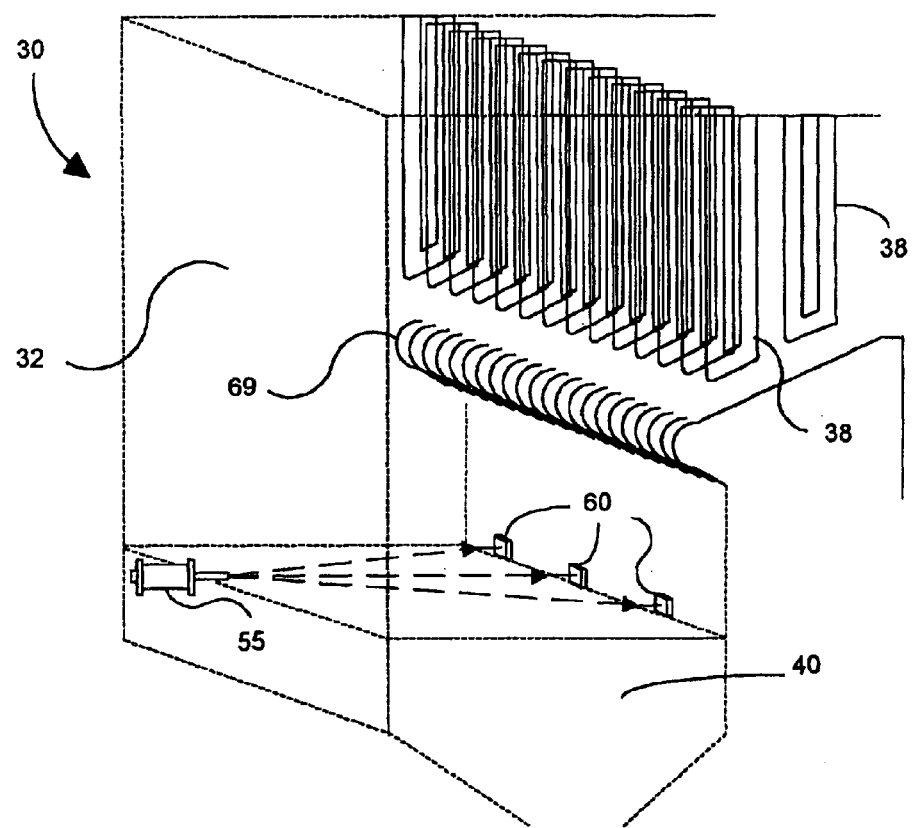
FIG. 1 is a schematic perspective view of a coal-fired boiler with an acoustic pyrometer system in accordance with this invention.
Figure 3:
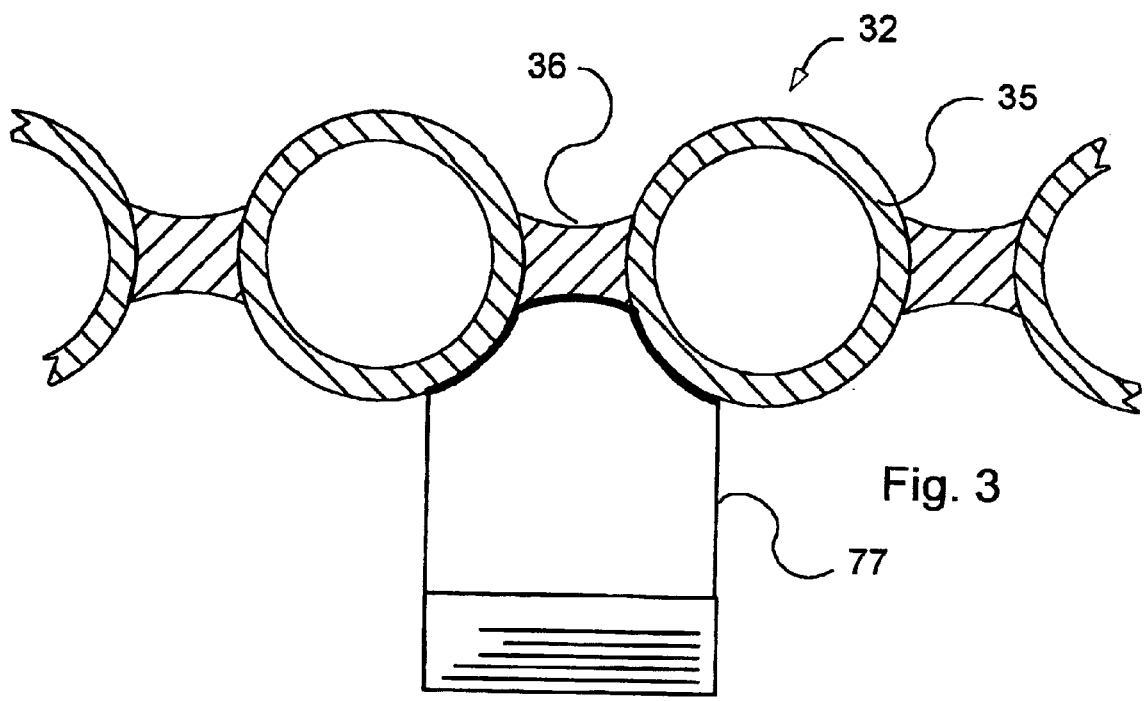
FIG. 3 is a sectional plan view of a boiler tube wall with a mounting coupling by which the signal generator is mounted.

Turning now to the drawings, wherein like reference numerals designate identical or corresponding parts, and more particularly to FIGS. 1–3 thereof, a coal fired boiler 30 is shown schematically having walls 32 formed of steam/water tubes 35 joined edge-to-edge with webs 36, as shown in FIG. 3. Pendent steam/water tube loops 38 extend into a stream of hot combustion gas products from a furnace 40 which burns powdered coal. The furnace 40 may have various burner configurations, such as an effective arrangement shown in FIG. 6 having a series of adjustable burners 42 arranged tangentially around a central area to produce a swirling fireball 44 centered in the furnace.

The pendant tubes 38 occupy an open space within the boiler that can exceed fifty feet across. For example, a B&W 670 Megawatt boiler has a span of about 67 feet. The atmosphere inside an operating coal-fired boiler is typically dirty, with a high concentration of suspended particulates, and is also very noisy because of the turbulence of the combustion gases, boiling of water in the tubes 35 and 38, and operation of soot blowers (cleaning devices) inside the boiler to prevent slag build-up on the boiler. These conditions present an extremely hostile environment for operation of gas temperature measurement systems within the boiler.

Figure 9:
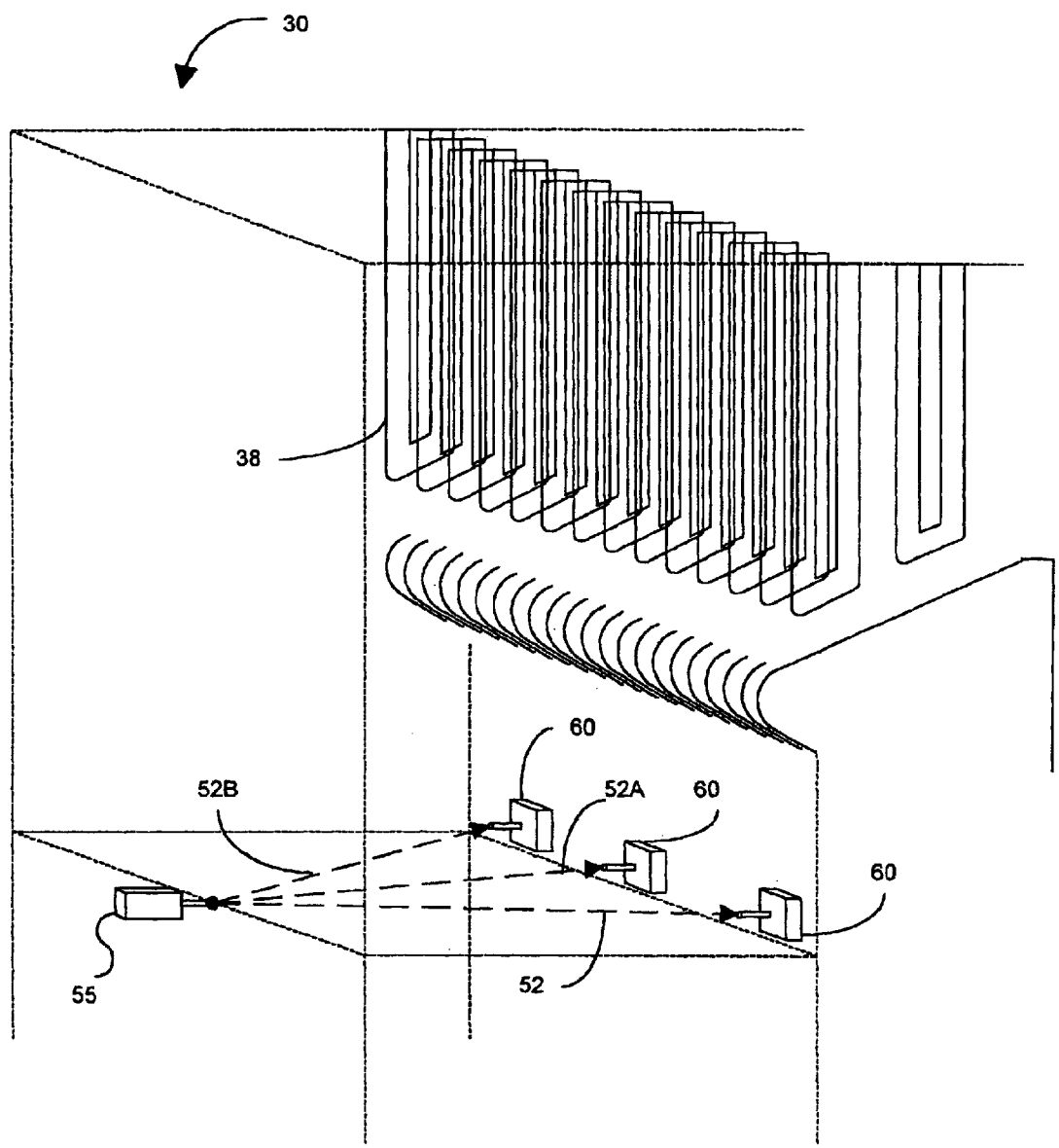
Figure 10:
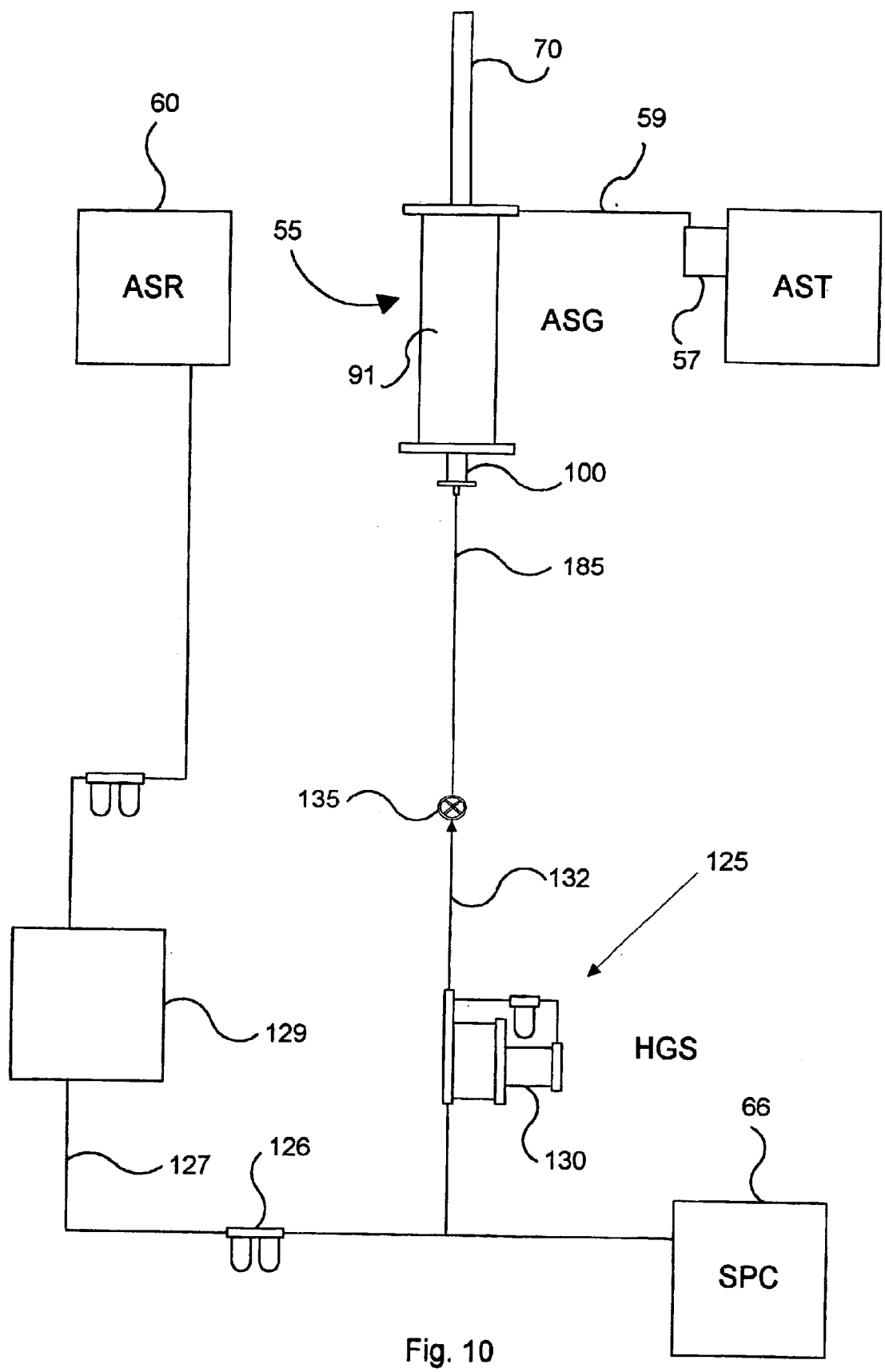
FIGS. 10 and 11 are schematic pneumatic and electrical diagrams for an acoustic pyrometer in accordance with this invention.
Figure 11:
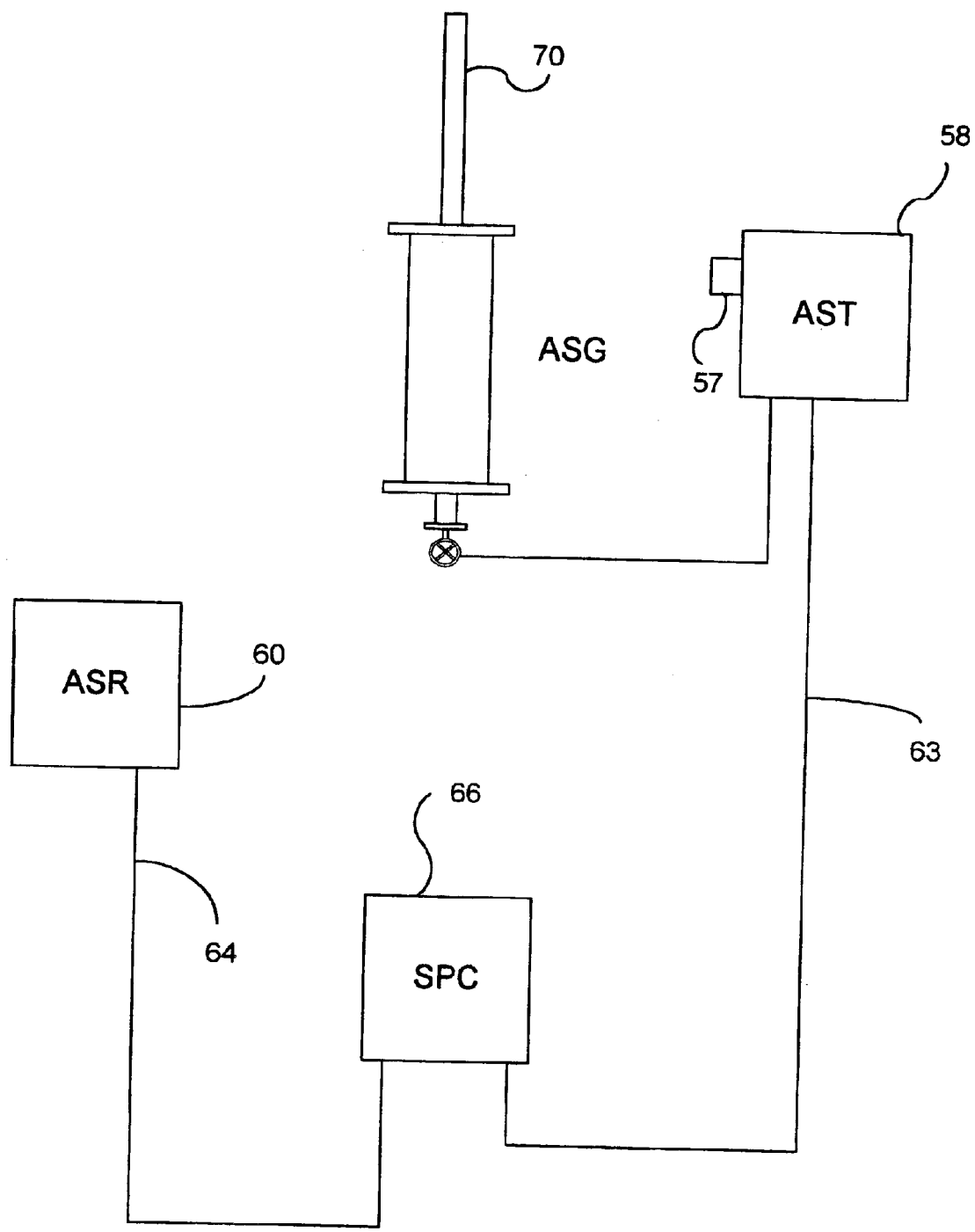

An acoustic pyrometer 50, shown schematically in FIGS. 7–11, measures the average gas temperature along one or more paths 52, 52A, 52B, etc. across the open space in the boiler or other open space of a known distance. The acoustic pyrometer 50 includes an acoustic signal generator (ASG) 55 for generating an acoustic signal 56 with a fast rise time and high amplitude. A means of detection such as a microphone 57, shown in FIGS. 10 and 11, is connected to the acoustic signal generator 55 through a tube 59 in a position to detect the generation of the acoustic signal produced by the acoustic signal generator 55. Other types of detection means are contemplated also, as described below. The microphone 57 detects the onset of the signal 56 in the acoustic signal generator 55 and generates a first electrical signal corresponding closely in time to the generation of the acoustic signal 56 in the acoustic signal generator 55.

An acoustic signal receiver (ASR) 60 is positioned across the boiler or other space of known distance from the signal generator 55, and has a microphone 62 or other transducer for receiving acoustic signals from the space and for generating electrical signals corresponding to amplitude and frequency of the acoustic signals received in the receiver 60. The electrical signals from the signal detector 57 and the receiver microphone 62 are sent via electrical conductors 63 and 64 to a signal processor 65 in a system controller 66 for processing, to distinguish the arrival of the acoustic signal generated by the acoustic signal generator 55 from background noise in the space as detected in the receiver 60, and for comparing the time of the arrival of the acoustic signal in the receiver 60 with the time of generation or onset of the acoustic signal in the signal generator 65 to determine the transit time of the acoustic signal to traverse the space, and for calculating the temperature of the gas in the space, based on the transit time.

The microphone 57 is conveniently mounted in an enclosure for an acoustic signal trigger 68 which provides the electrical interface between the signal processor 65 and the acoustic signal generator 55. Alternatively, the means for detecting the onset of the signal in the signal generator 55 could be sensors in the signal generator itself. Such sensors could be acoustic sensors such as a microphone or piezoelectric devices, or could be motion or proximity sensors of the electrical or optical varieties that sense movement of components in the signal generator that move to release pressurized gas that creates the acoustic signal 56. Other sensors are possible as will be appreciated by those skilled in the art.

Figure 4:
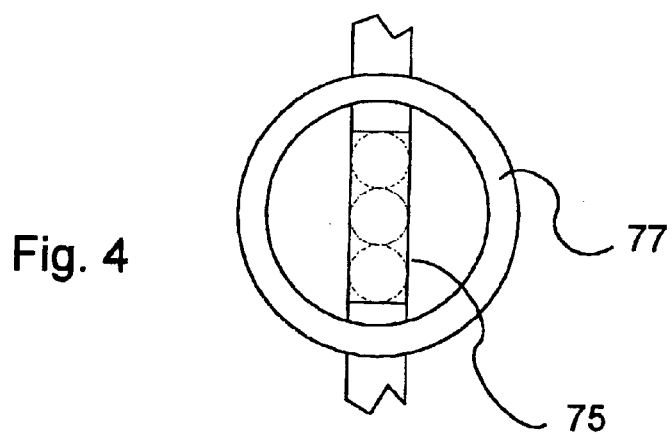
FIGS. 4 and 5 are front and side elevations of a coupling mounted on the tube wall shown in FIG. 3.
Figure 5:
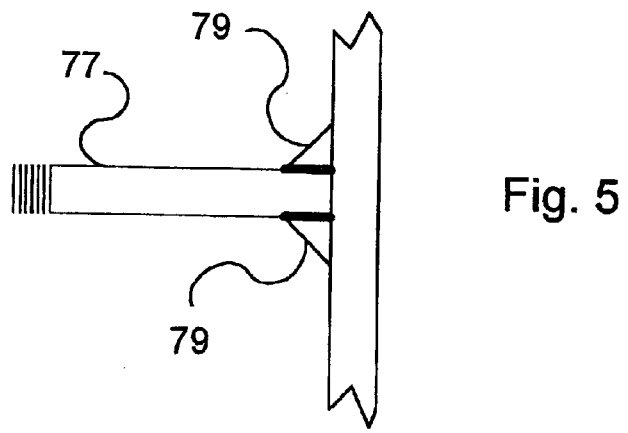

Typically, as illustrated in FIG. 1, the acoustic signal generator 55 is mounted in one tube wall 32 of the boiler and the receiver 60, or as shown in FIG. 1, three receivers 60 are mounted in the opposite tube wall directly over the furnace 40 to give information about the temperature distribution of the gas at the furnace exit plane. In FIG. 2, the acoustic signal generator 55 is mounted in a side tube wall above the bull nose tube wall 69 and in front of the first row of pendent tubes 38, and three receivers 60 are mounted in the opposite side tube wall, also in front of the first row of pendant tubes 38 to obtain information about vertical distribution of the gas temperatures as the gas enters the pendant tube banks. One convenient and minimally invasive mounting technique for the receiver 60, shown in FIGS. 3–5, is to cut a narrow slot 75 through the web 36 connecting adjacent tubes 35 of the tube wall 32. A conventional coupling 77 is welded to the web above and below the slot and preferably the coupling is also supported by top and bottom gussets 79 welded in place. The receiver 60 can be mounted on the tube wall in this fashion without modifications of, or interference with, the operation of the tube wall 32 and without using any of the existing ports. Another mounting technique uses the existing ports in the tube wall, as shown in FIGS. 12–19. A port door 80 over the existing port is removed and an adapter 82 is secured in its place using the port door hinge knuckles and latch to secure the adapter 82 in place.

Figure 12:
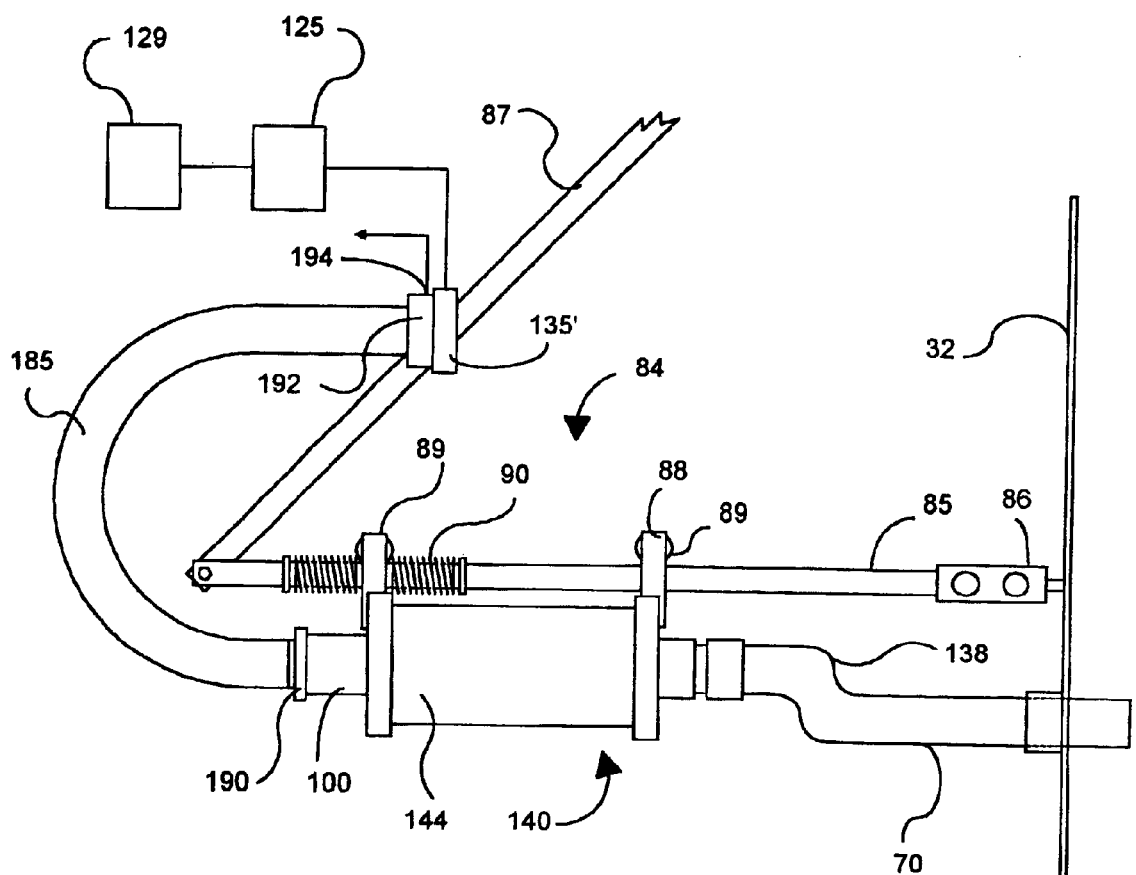
FIG. 12 is a side elevation showing a mechanical structure for mounting the signal generator shown in FIG. 10 on the tube wall of a boiler.
Figure 18:
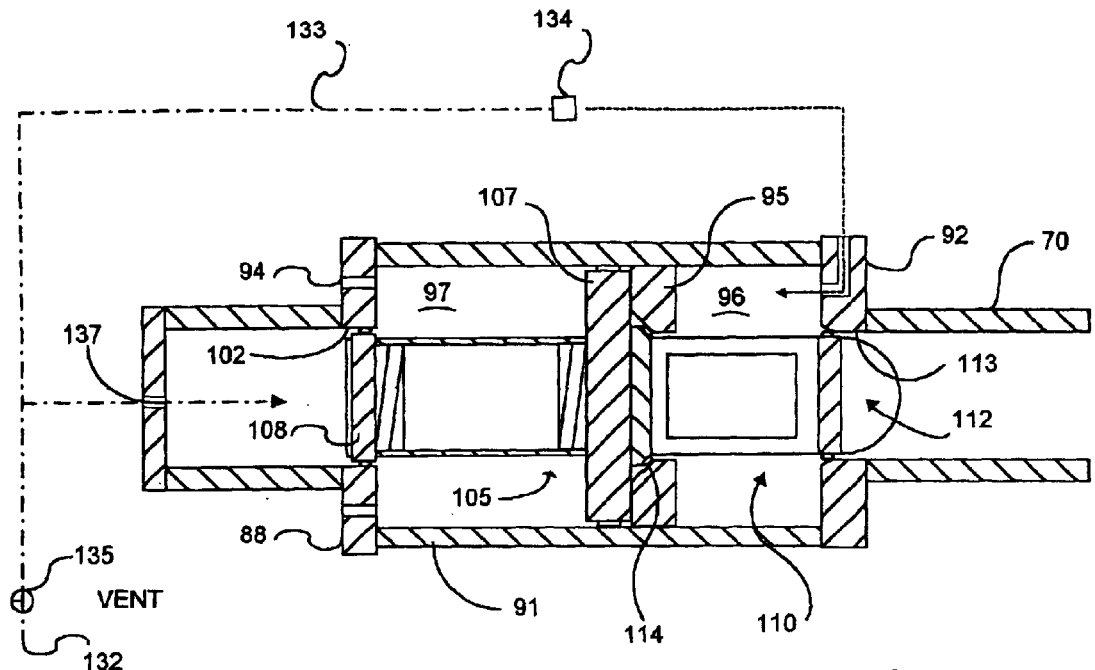
FIG. 18 is a sectional schematic elevation of the signal generator shown in FIG. 12 in the ready-to-fire configuration.
Figure 19:
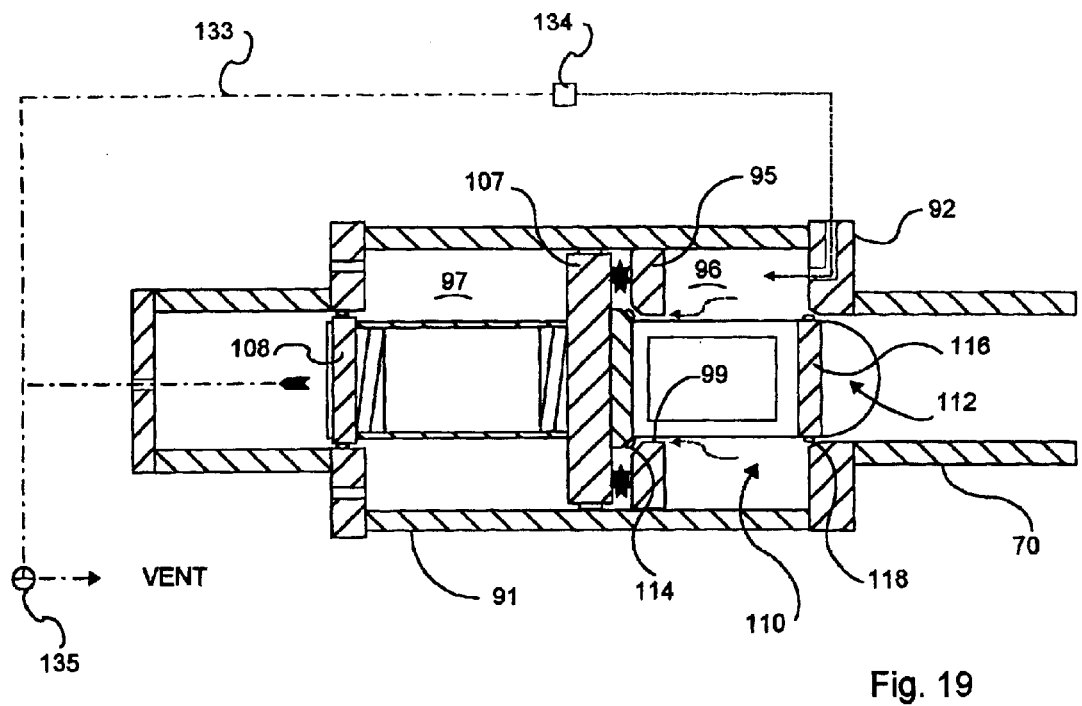
FIG. 19 is a sectional schematic elevation of the signal generator shown in FIG. 18 with the valve opened and the seal between the front and rear chambers just broken.
Figure 20:
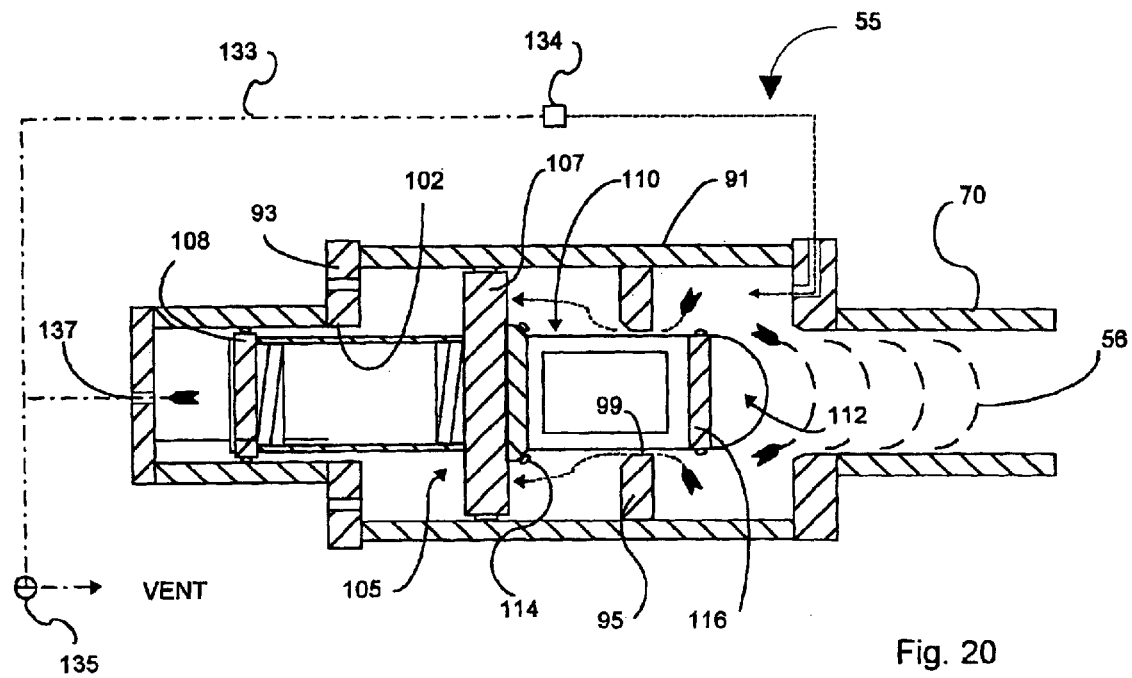
FIG. 20 is a sectional schematic elevation of the signal generator shown in FIG. 18 with the piston accelerated rapidly to the rear, opening the front seal and releasing the acoustic signal which is shown propagating down the barrel.

The signal generator 55 may be mounted to the adaptor 82 on the tube wall by conventional mounting brackets or the like, although a hanger system 84 shown in FIG. 12 is preferred. The hanger system 84 includes a hanger beam 85 supported at one end on a connector 86 attached to the tube wall 32, and at the other end to diagonal brace 87 extending down from another coupling (not shown) at the tube wall 32 above the coupling 86. The acoustic signal generator 55 has a pair of yokes 88, each having a wheel 89 at its upper end by which the signal generator 55 is supported on the rail 85 to accommodate recoil movement when the signal generator operates. A pair of compression springs 90 on opposite sides of one of the yokes absorbs the recoil energy and returns the signal generator to its start position after each operation.

Figure 21:
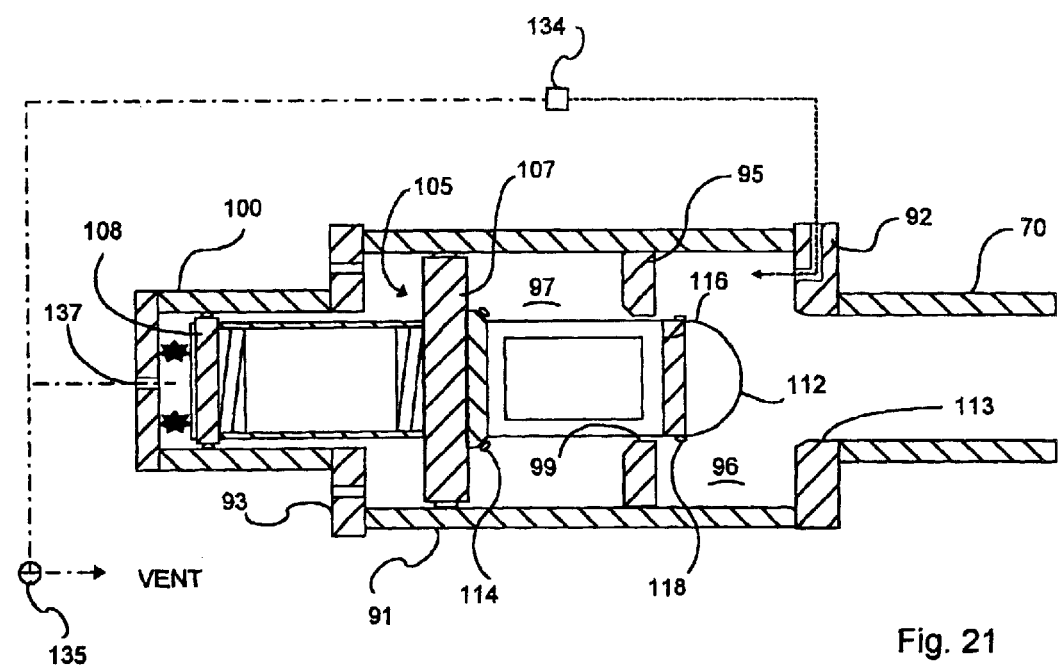
FIG. 21 is a sectional schematic elevation of the signal generator shown in FIG. 18 with the piston being decelerated by a gas cushion trapped in the end of the rear cylinder.
Figure 22:
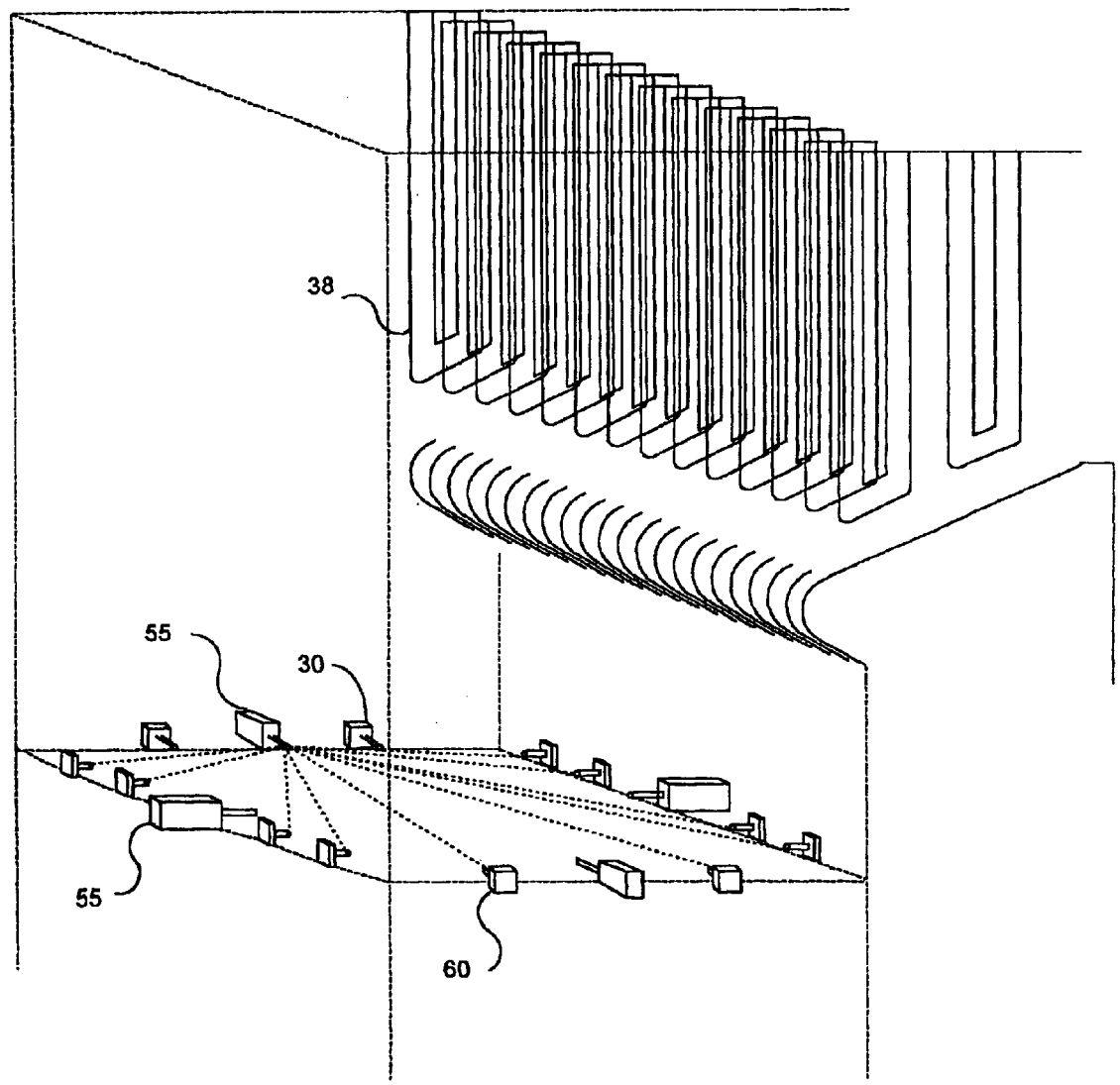
FIG. 22 is a schematic perspective view of the interior of a boiler showing an array of signal generators and receivers arranged in the furnace exit plane in a position to produce a thermal map of the temperatures in the furnace exit plane.
Figure 23:
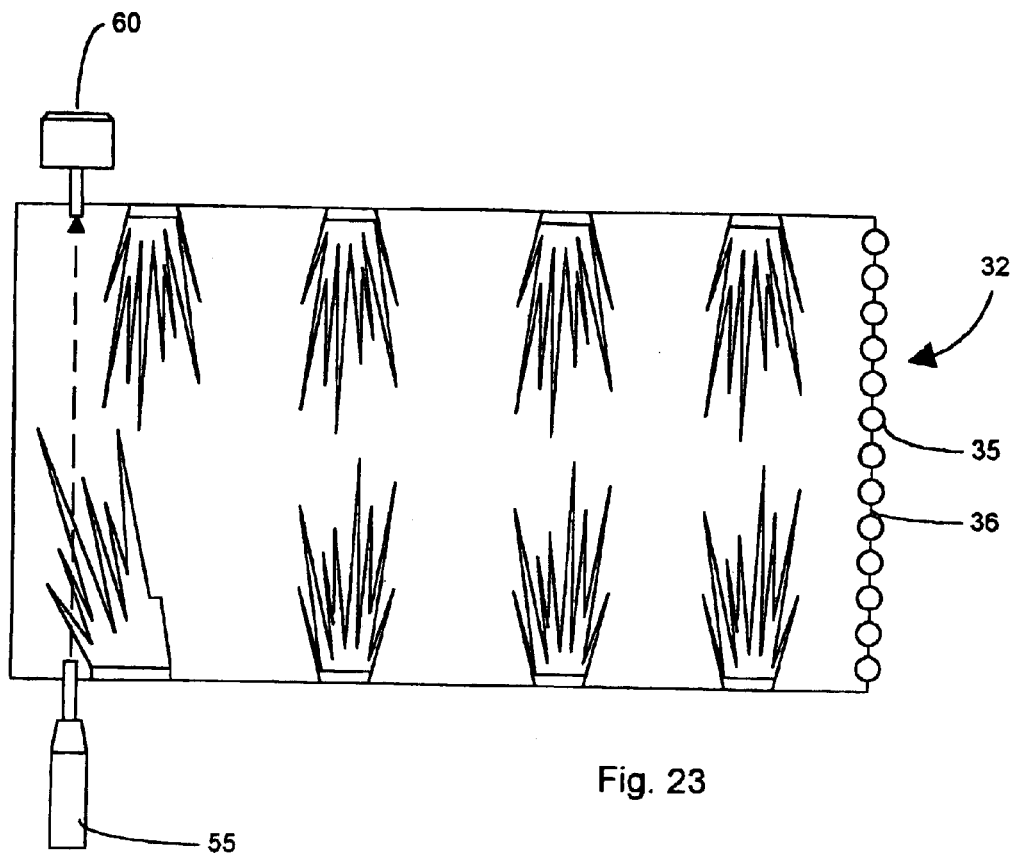
FIGS. 23 and 24 are schematic plan views of a furnace with parallel opposed burners and an acoustic pyrometer in accordance with this invention arranged to produce firewall impingement temperature data.

The acoustic signal generator 55 generates an acoustic signal with a high amplitude, fast rise time. The acoustic signal generator, shown in FIGS. 20–23, includes a main cylinder 91 having front and rear opposed end closures 92 and 93, respectively, at front and rear axial openings in the front and rear ends of the cylinder 91, respectively. An internal partition 95 at an intermediate portion of the main cylinder divides the cylinder into front and rear chambers 96 and 97, respectively, and an axial port 99 in the partition 95 communicates between the front and rear chambers 96 and 97. The rear end closure 93 has openings 94 to allow air to move freely into and out of the rear chamber 97 as shown in FIG. 22. A rear cylinder 100 is attached to the rear closure 93 around a rear axial opening 102 which provides communication therethrough between the rear chamber 97 and the rear cylinder 100. A piston assembly 105 has an intermediate piston 107 in the rear chamber 97, and a rear piston 108 in the rear cylinder 100. A seal assembly 110 is connected to the front end of the piston assembly 105, specifically, to the front face of the intermediate piston 107, for movement therewith. The seal assembly 110 has a front plug seal 112 plugging a front end axial opening 113 in the front closure 92, and has an intermediate seal 114 plugging the axial port 99 in the partition 95. The intermediate seal 114 is preferably slightly larger than the front seal 112 so there is an unbalanced pneumatic force exerted by gas pressure in the front chamber 96 on the seal assembly 110 tending to open the seal assembly 110 to the rear. The front plug seal 112 includes a plug 116 with a sliding seal 118 disposed in the front axial opening 113 and movable axially therein. The nozzle or barrel 70 of the signal generator is attached to the front closure 92 of the main cylinder 85 in communication with the front opening 113.

A pneumatic operating system, shown schematically in FIGS. 10 and 20–23, is provided for charging the front chamber 96 of the main cylinder 91 with gas at a first high pressure and for charging the rear cylinder 100 with gas at a second high pressure. The gas could be air, carbon dioxide, nitrogen, or some other suitable gas. The pneumatic operating system includes a high pressure gas supply 125, shown in FIG. 10, coupled via an gas filter 126 in an inlet gas line 127 to a source of gas pressure 129, such as a plant pressure supply line. A pressure amplifier 130 of conventional design raises the gas pressure supplied by the source 129 to an elevated pressure on the order of 250–400 PSI, preferably 400 PSI, to be supplied through an inlet gas line 132 via a 3-way solenoid valve 135 to the rear cylinder 100 of the signal generator 55. An extension 133 of the inlet gas line 132 supplies pressurized air to the front chamber 96 through a restriction 134. The restriction 134 could be a reduction in the internal diameter of the gas supply line 133 to the front chamber 96 or could be an apertured or porous plug inserted in the line 133.

The three-way solenoid valve 135 is remotely operated by the controller 66 to admit the pressurized gas from the high pressure gas supply 125 through a restriction 137 into the rear cylinder 100, and, when operated, to close off the signal generator 55 from the high pressure gas system 125 and to allow gas to escape from the rear cylinder 100 through an integral bleed vent in the valve 135 at a selected rate. The pressure in the rear cylinder 100 drops faster than the pressure in the front chamber 96 because the restriction 134 to the front chamber 96 is much smaller than the restriction 137 to the rear cylinder. When the pressure in the rear cylinder 100 has dropped sufficiently because of the escape of air through the restriction 137 and the bleed vent in the valve 135, the sum of forces acting on the piston assembly 105 moves it to the rear as shown in FIG. 21. Specifically, the sum of the forwardly directed forces on the piston assembly 105 exerted by pressurized gas on the rear piston 108 in the rear chamber plus the forwardly directed forces exerted by the pressurized gas in the front chamber 96 on the front plug seal 112 drops below the rearwardly directed forces exerted by pressurized gas in the front chamber 96 against the intermediate seal 114. The piston assembly 105 moves to the rear, unsealing the axial port 99 and allowing the full gas pressure in the front chamber 97 to act against the front face of the intermediate piston 107. The piston assembly 105 and the attached seal assembly 110 is propelled at high acceleration to the rear under the influence of the unbalanced pneumatic pressure against the front face of the intermediate piston 107. As shown in FIG. 21, the front seal 118 is not yet opened while the piston assembly is accelerating to the rear.

As shown in FIG. 22, the accelerating piston assembly 105 moves to the rear far enough to pull the plug 116 clear of the front axial opening 113 in the front closure 92 of the main cylinder 91. Because the piston assembly 105 is moving fast by the time the seal 118 opens, the plug 116 moves from a closed position to a fully opened position shown in FIG. 22 in a very short time, typically less than 3 milliseconds. This allows the pressurized air in the front chamber 96 to escape explosively through the nozzle 70, producing a high amplitude acoustic signal having a sudden sharp onset, that is, a fast rise time.

The piston assembly 105 continues its rearward travel, driving the piston 108 toward the rear end of the cylinder 100. The restriction 137 vents pressure from the rear cylinder 100 through the bleed vent in the valve 135 slowly enough that the piston 108 can compress the air in the cylinder 100 to function as a gas cushion, slowing and stopping the rearward movement of the piston assembly 105 and preventing hard contact between the rear piston 108 with the rear end of the cylinder 100.

The valve 135 is now operated to connect the main cylinder 91 to the high pressure gas supply system 125. The gas enters the rear cylinder 100 slowly, through the restriction 137, so that the intermediate piston 107 makes soft contact with the partition 95. Simultaneously, the front chamber 96 is being pressurized, at a slower rate, through the restriction 134, so the pressure acting on piston assembly 105 remains unbalanced until after the seal 114 seals the axial port 99 in the partition 95.

As shown in FIG. 12, the nozzle 70 has an off-set or jog bend 138 that stops debris that may enter the nozzle 70 from entering into the front chamber 96, and blocks transmission of radiant heat directly into the signal generator 55 from the boiler interior. A U-shaped bend has also been used successfully for this same purpose.

The process performed by the acoustic signal generator 55 to generate a high amplitude acoustic signal having a fast rise time includes plugging the front axial opening 113 in the front chamber 96 within the main cylinder 91 by positioning the plug 116 in the opening and pressurizing the front chamber 96 and the rear cylinder 100 with gas. The rear cylinder 100 is then vented until the forwardly directed force exerted by the gas in the rear cylinder drops below the rearwardly directed force exerted by the gas in the front chamber 96 on seal assembly 110, causing the piston assembly 105 and the seal assembly 110 to move to the rear. Rearward movement of the intermediate seal 114 allows pressurized gas to escape from the front chamber 96 to the rear side of the partition 95 where it acts against the intermediate piston 107, accelerating the piston assembly 105 and attached seal assembly 110 to high speed prior to unplugging the front opening 113 in the front chamber 96.

Figure 24:
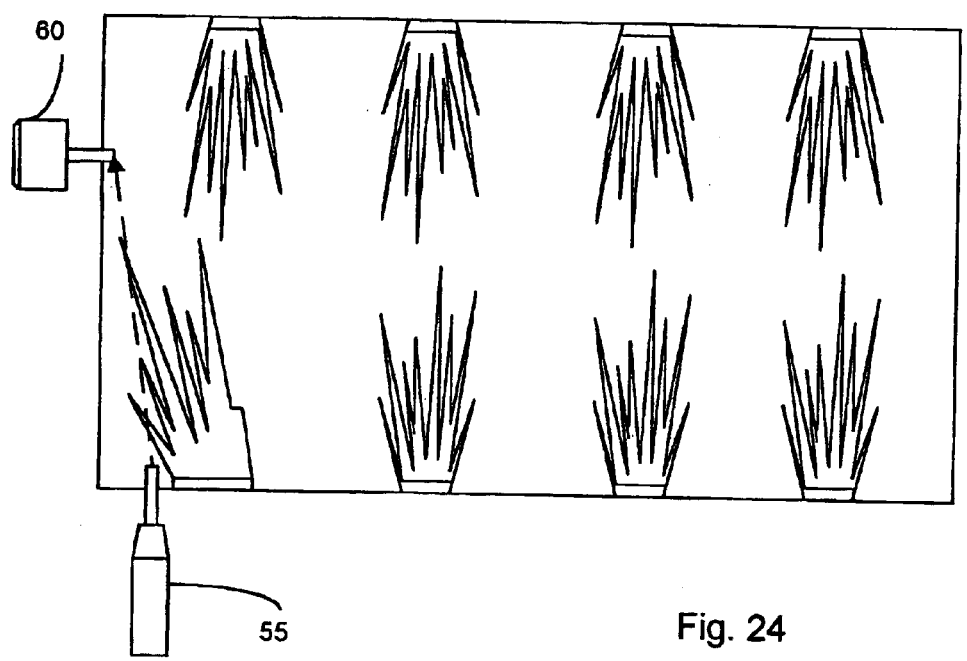
Figure 25:
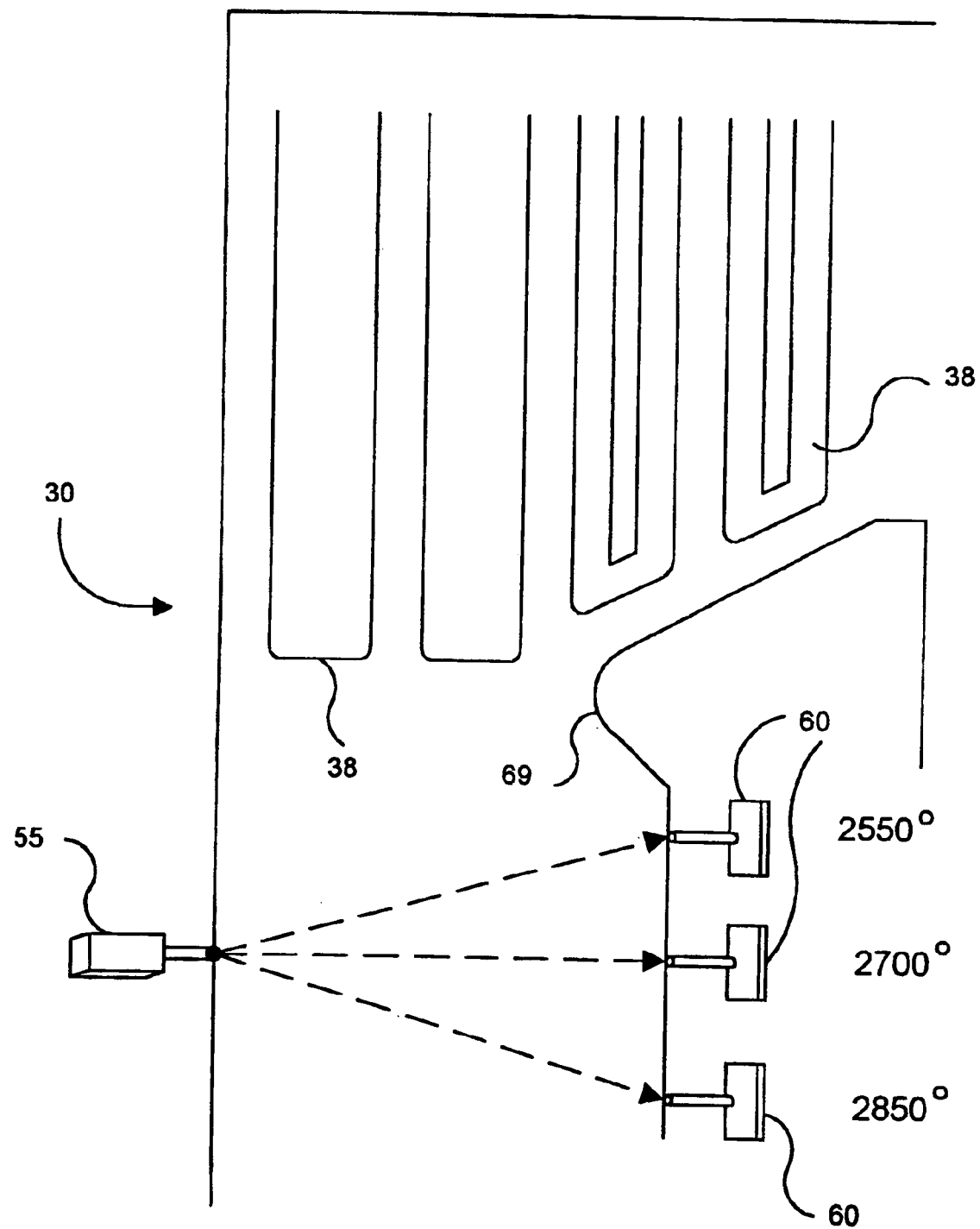
FIG. 25 is a schematic side elevation of a boiler with an acoustic pyrometer in accordance with this invention arranged to produce data regarding the vertical temperature gradient for management of thermal $No_x$ in the boiler.
Figure 26:
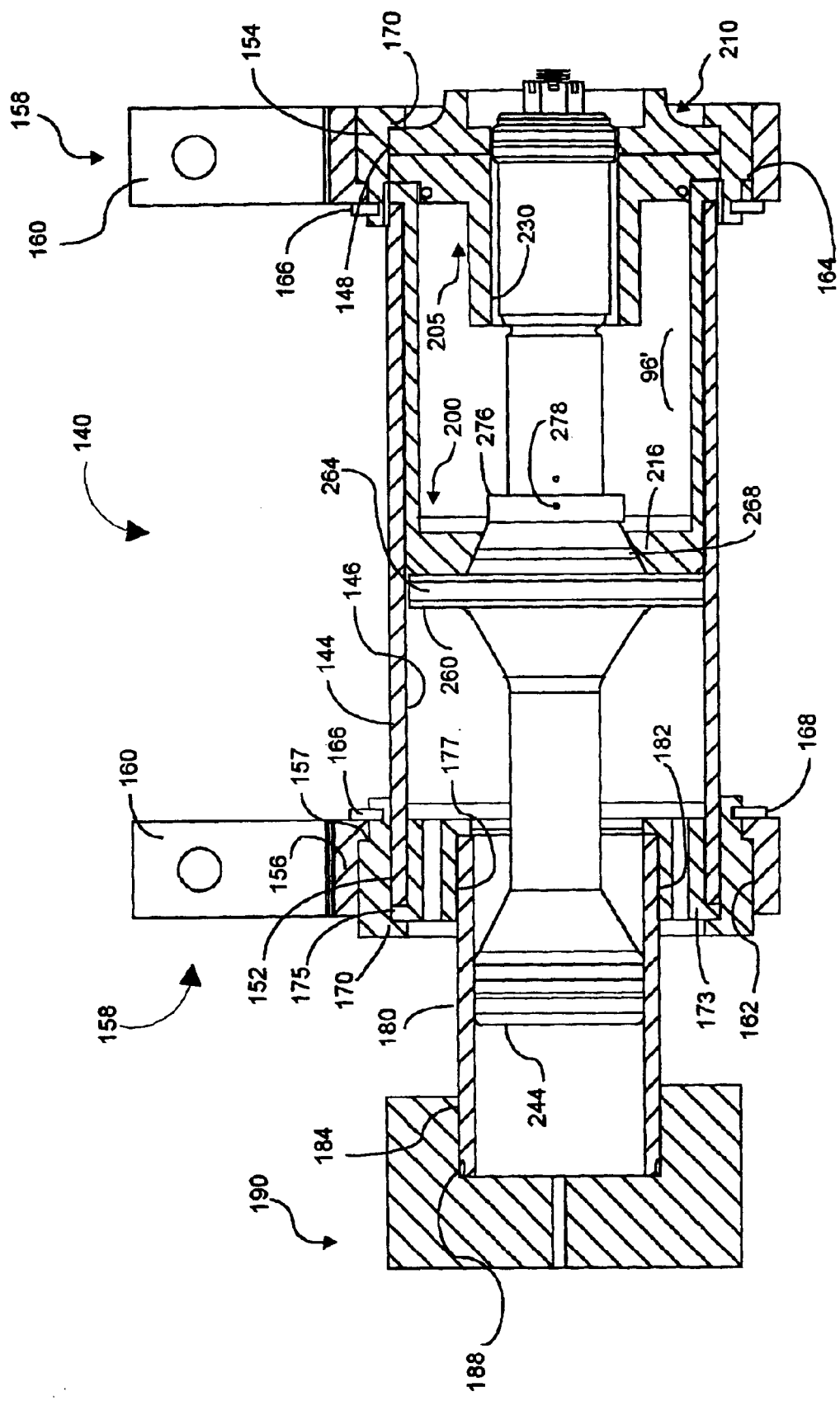
FIG. 26 is a sectional elevation of a signal generator for a acoustic pyrometer in accordance with this invention.

Accelerated to high speed, the piston 116 moves in less than 3 milliseconds from a fully plugged position in the front axial opening or throat 113 to a fully unplugged position, unplugging the opening 113 and releasing pressurized gas suddenly to burst explosively from the cavity through the nozzle 70 into the boiler. Since the opening communicates through the front closure 92 of the main cylinder 91 between the front chamber 96 and the space inside the boiler, rapid removal of the plug 116 allows sudden explosive release of the pressurized gas in the front chamber 96 through the nozzle 70 into the boiler, producing a high amplitude acoustic signal 56 of about 185 db or greater having a sudden sharp onset with a fast rise time. The signal 56 propagates spherically and is strong enough to reach across boilers as large as 95 feet across as a high amplitude signal, so it need not be aimed at particular receivers. It can be detected by multiple receivers 60, enabling the use of advanced diagnostics such as furnace plane thermal tomography, illustrated in FIG. 24, wherein the average temperature on multiple scans across a plane at the furnace exit can be plotted to yield information about the uniformity of the heat flux emanating from the boiler furnace. Flame impingement against the tube wall 32 can be detected as shown in FIGS. 25 and 26 by arranging the signal generators 55 and the receivers 60 to produce signal paths alongside the tube walls 32. Thermal $NO_X$ can be monitored as shown in FIG. 27 by arranging several receivers 60 to take readings of gas temperatures as the gas passes through the boiler to ensure that it does not have any extended time above 2700° F., above which thermal $NO_X$ formation is accelerated.

Since the venting of gas from the rear cylinder is at a controlled rate, a gas cushion remains in the cylinder 100 which prevents the rear piston 108 from making contact with the rear end of the cylinder 100. The signal generator is reset for the next signal by operating the valve 135 to pass gas under pressure to the rear cylinder 100 through the restriction 137 and to the front chamber 96 through the restriction 134. Gas pressure in the rear cylinder pushes the piston assembly 105 forward into gentle engagement with the intermediate partition 95 and the seal 114 seals the axial port 99 in the intermediate partition 95, allowing gas pressure to build in the front chamber 96 to the designated operating pressure. The signal generator is now ready for operation to produce the next acoustic signal.

The signal generator may be made in numerous ways, and it is intended that these various designs be encompassed by the claims appended hereto. The preferred embodiment of the acoustic signal generator is shown at 140 in FIGS. 26–30. This acoustic signal generator 140 uses several simple and inexpensive machined parts of rugged design which fit together simply and may be easily disassembled for routine maintenance and repair.

Figure 26A:
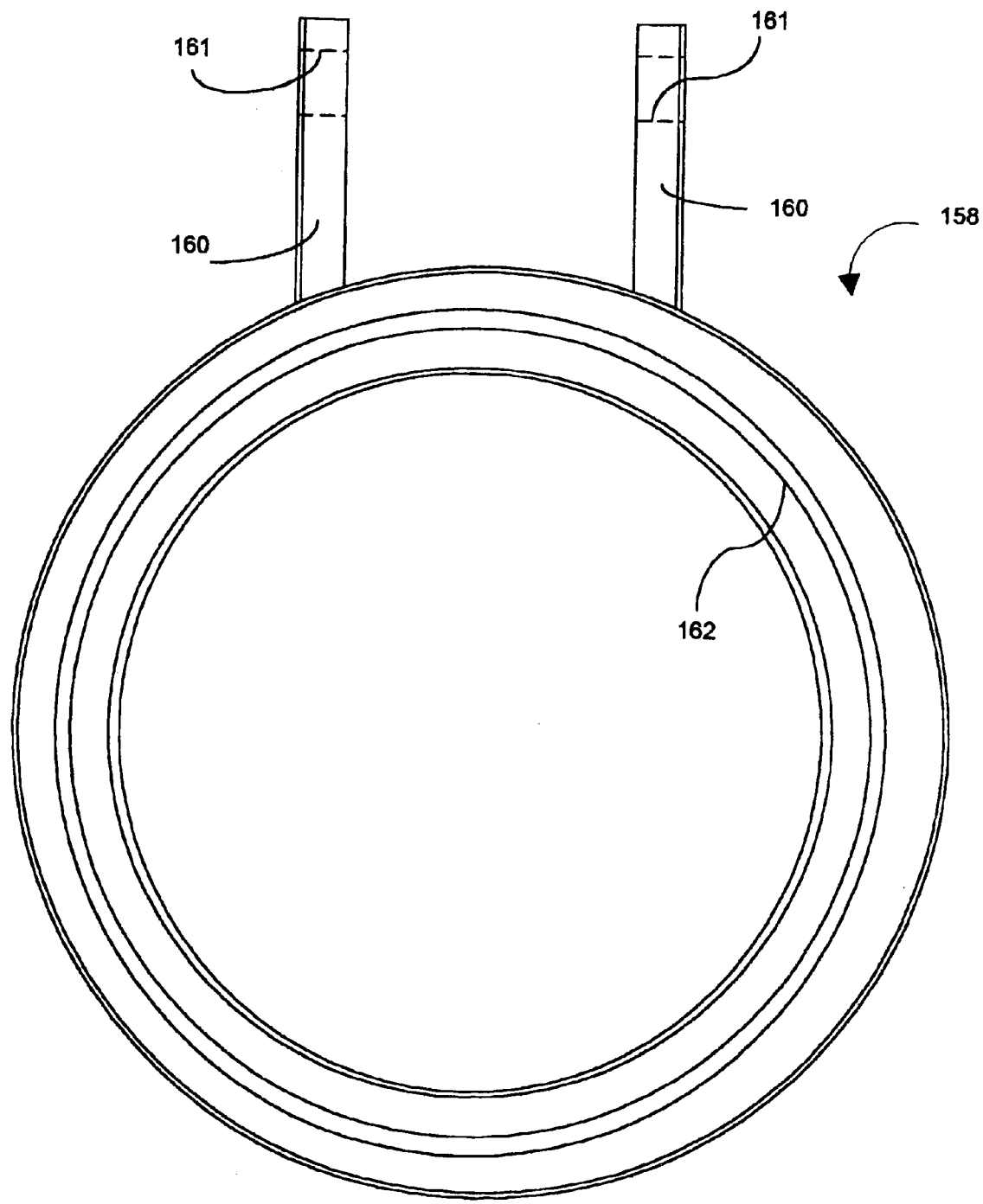
FIG. 26A is an end elevation of one of the hangers shown in FIG. 26.

Referring to FIG. 26, the sound generator 140 includes a straight cylinder 144 having a smooth cylindrical bore 146 and is externally threaded at both a front end 148 and a rear end 152 to receive front and rear outer end nuts 154 and 156, respectively. The outer diameter of the inner ends of the outer end nuts 154 and 156 are stepped to a reduced diameter, producing in external shoulder 157. Each outer end nut 154 and 156 receives a hanger ring 158, shown in FIG. 26A. The hanger rings 158 each have a pair of spaced hanger straps 160 by which the sound generator 140 is hung from a hanger beam 85 adjacent the boiler tube wall, as shown in FIG. 12. A pair of aligned holes 161 in the top end of the hanger straps 160 receive a shaft (not shown) on which the wheels 89 are mounted for supporting the signal generator 140 from the hanger beam 85, as shown in FIG. 12. Each hanger ring 158 has a stepped bore 162 providing an internal shoulder 164 that engages the shoulder 157 on the exterior of the outer end nuts 154 and 156 to locate the axial position of the hanger rings 158 relative to the outer end nuts 154 and 156. A snap ring 166 fits into a groove 168 in each outer end nut 154 and 156 to secure the hanger rings 158 in position on the outer end nuts 154 and 156.

Each outer end nut 154 and 156 has an outer end flange 170 extending radially inward for securing other components to the ends of the cylinder 144. At the rear end, the end nut 156 secures an annular port plate 173 to the end of the cylinder 144 by clamping an outwardly extending flange 175 on the port plate 173 to the end of the cylinder 144. The port plate has a cylindrical outer surface which fits with a snug sliding fit into the cylinder 144, and has an axial bore 177 which is internally threaded. A series of axial holes 178 in the annular port plate 173 vents gas from the interior of the cylinder 144.

A rear cylinder 180 having external threads on its front end 182 and its rear end 184 is threaded at its front end 182 into the internally threaded bore 177 of the annular port plate. An inlet nut 190 is threaded onto the rear end 184 of the rear cylinder 180 and traps an "O"-ring seal 188 to hermetically seal the inlet nut 190 to the rear end of the rear cylinder 180. A large diameter flexible hose 185, about 1½" in diameter and 36" in length, is attached to the rear face of the inlet nut 190, as shown in FIG. 12. The attachment hardware for connecting and hermetically sealing the hose 185 to the inlet nut is conventional and is not shown. A 2-way valve 135' is attached to a hose plate 192 at the other end of the hose 185. In this embodiment, the 2-way valve 135' is more robust and durable than the 3-way valve 135 shown in FIG. 10. A bleed port 194 in the hose plate 192 continuously vents the hose 185 at a slow flow rate. The flow rate produced by high pressure gas supply 125 is far greater than the flow rate through the bleed port 194 so the time to pressurize the acoustic signal generator 140 is not significantly longer than for the embodiment of FIGS. 18–21.

The hose 185 provides a reservoir volume that protects the valve 135' from pressure spikes and a source of pressurized air that pushes the cylinder 244 forward to close the seal 268. The reservoir volume is not critical, but a reservoir volume that is too small does not provide the desired diffusion of the pressure pulse, and a reservoir volume that is too large does not reduce in pressure as fast a desired when the valve 135' operates and can reduce the gas cushion effect at the rear end of the rear cylinder 180 that safely decelerates the shaft/piston 240 after releasing the acoustic signal. The hose 185 should be between 24" and 54" long, with the optimal length about 36" for a 1½" diameter hose.

The front outer end nut 154 has an inwardly extending flange 171 at its front end that clamps three components to the front end of the cylinder 144: a cylinder liner can 200, a throat plate 205, and a nozzle weld ring 210. The cylinder liner can 200 has a cylindrical body 212 that fits with a snug sliding fit into the cylinder 144. The front end of the cylindrical body 212 ends in an outwardly extending radial flange 214 and the rear end is formed as a partition 216 having a central conical axial port 218.

The throat plate 205 has a radial flange 222 by which the throat plate is clamped to the end of the cylinder 144 by the front outer end nut 154. The outer cylindrical periphery of the throat plate 205 adjacent the flange 222 has a groove which holds an "O"-ring seal 225 for hermetically sealing the throat plate to the cylinder liner can 200. A central axial throat 227 extends rearward from the throat plate 205 and defines an axial bore 230 opening in the front end of the acoustic signal generator 140.

The nozzle weld ring 210 has a central axial opening 232 aligned with the bore 230 in the throat plate 205. An annular lip 235 disposed coaxially around the opening 232 provides a structure to which the barrel 70 can be attached, as by welding or other suitable means of attachment. The barrel 70 is preferably about 7' long which provides a comfortable stand-off distance from the hot tube wall 32 and has the effect of sharpening the acoustic pulse with little or no attenuation.

Figure 28A:
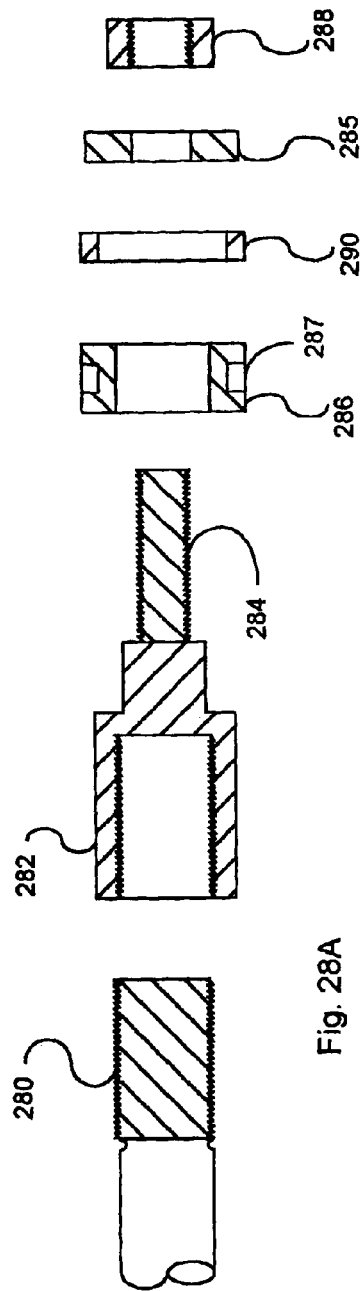
FIG. 28A is an exploded sectional elevation of the plug end of the integral piston/shaft shown in FIG. 28.
Figure 29:
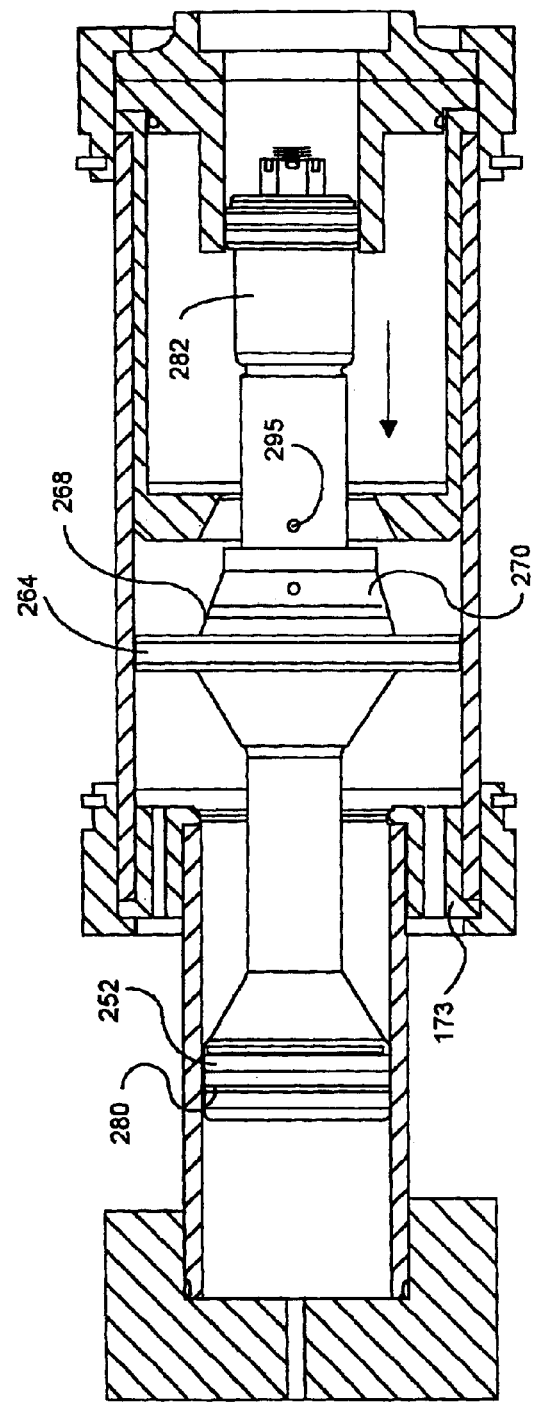
FIG. 29 is a sectional elevation of the signal generator shown in FIG. 26 with the seal between the front and rear chamber just broken.
Figure 30:
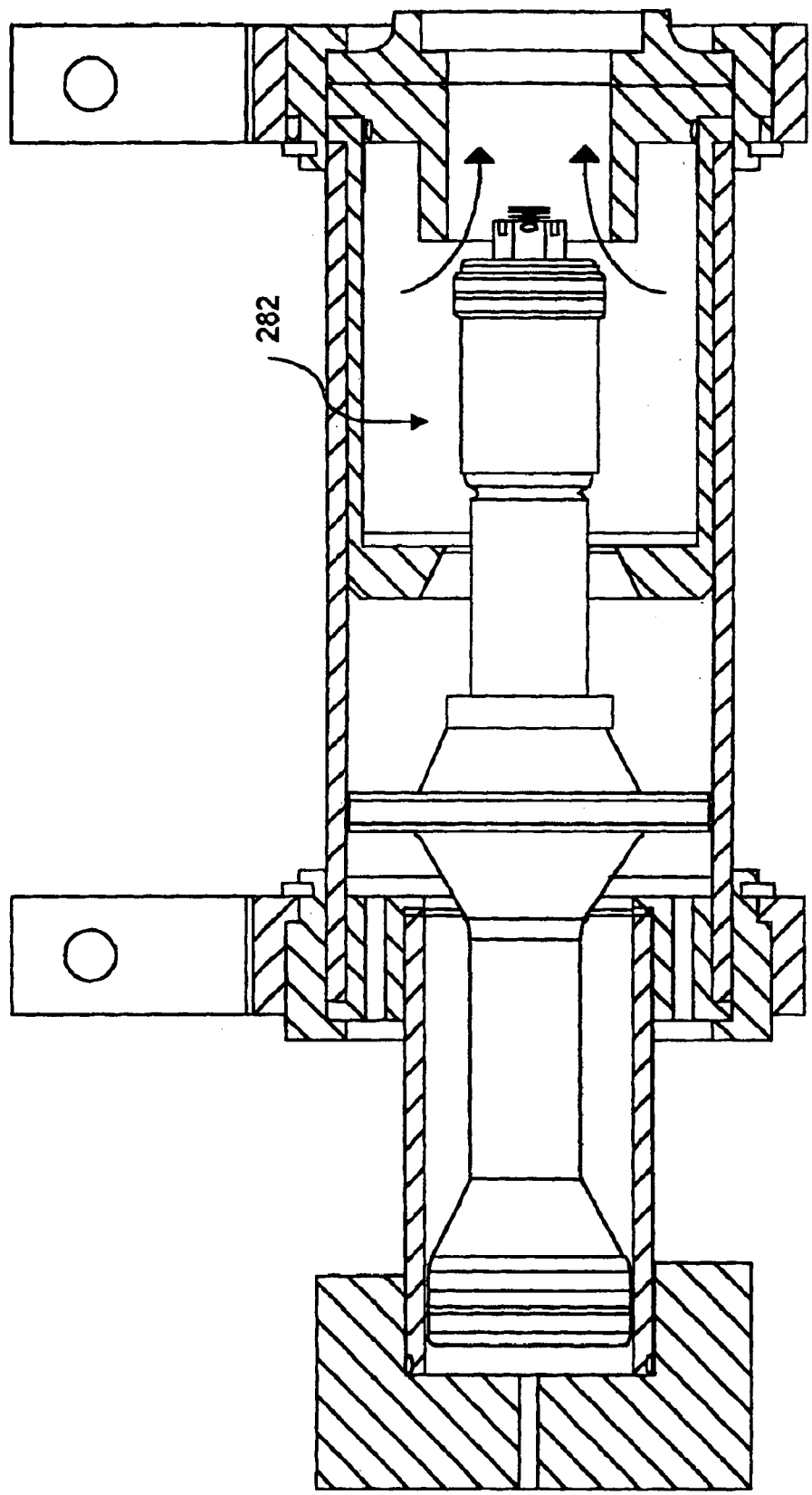
FIG. 30 is a sectional elevation of the signal generator shown in FIG. 26 with the front seal opened and releasing the acoustic signal.

A piston assembly 240, shown installed in the acoustic signal generator 140 in FIGS. 26, 29 and 30, includes an integral piston-shaft 242, shown in FIG. 28. The rear end of the piston-shaft 242 is machined as a cylindrical rear piston 244 having a groove 246 for a piston ring 248 and another groove 250 for a wear ring 252. The rear piston 244 tapers to a smaller diameter rear shaft 254 which then flares at an intermediate position to form an intermediate piston 260. A groove 262 in the outer cylindrical surface of the intermediate piston 260 receives a wear ring 264 which, with the wear ring 252 in the groove 250 of the rear piston 244, supports the piston-shaft 242 for axial movement in the cylinder 144. An annular groove 266 in the front face of the intermediate piston 260 receives an "O"-ring seal 268 for sealing the interface of the intermediate piston 260 and the tapering axial port 218 in the partition 216 when the piston-shaft 242 is in its forward-most position illustrated in FIG. 26. The "O"-ring seal 268 is held in place by a seal retainer ring 270 threaded onto a forward shaft portion 272 of the piston-shaft 242 which is threaded at 274 adjacent the intermediate piston 260. A lock ring 276 is threaded onto the threads 274 against the seal retainer ring 270 and secured in place with a set screw 278.

As shown in FIG. 28A, the front end 280 of the forward shaft portion 272 is threaded and threadedly receives a front piston barrel 282 which has a threaded stud 284 extending forwardly therefrom. A piston donut 286 slides onto the stud 284 followed by a washer 285 and is secured in place by a nut 288 which is locked by a lock-wire or cotter pin. The piston donut 286 has one or two grooves 287 for receiving one or preferably two piston rings 290.

Operation of the embodiment shown in FIGS. 26–30 is substantially the same as the embodiment shown in FIGS.

18–21. One difference between the two embodiments is the gas supply circuit. In the first embodiment, the gas lines are external to the main cylinder 91; in the second embodiment, the gas supply circuit is from the hose 185 through an opening 291 in the fitting 190 and into the rear cylinder 180. A threaded plug (not shown) in an internally threaded end 292 of an axial bore 293 in the piston-shaft 242 has a small diameter hole (not shown) drilled therethrough to admit pressurized air into the bore 293. That pressurized air is conveyed through the bore 293 and into the front chamber 96' by which the front chamber is pressurized after the pressure acting against the rear face of the piston 244 moves the piston-shaft 242 fully forward and seals the front chamber 96' with the seal 268.

Figure 31:
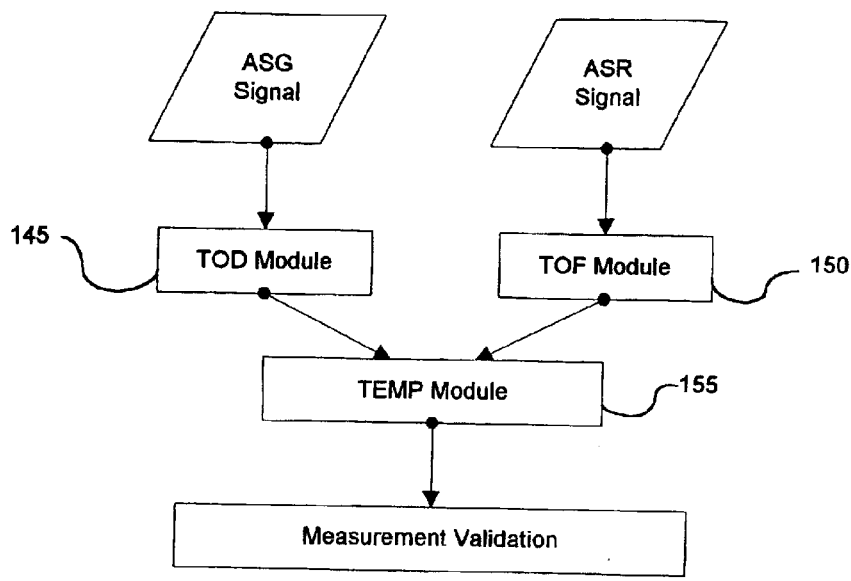
FIGS. 31–33 are block diagrams showing the operation of the signal processor for an acoustic pyrometer in accordance with this invention.
Figure 32:
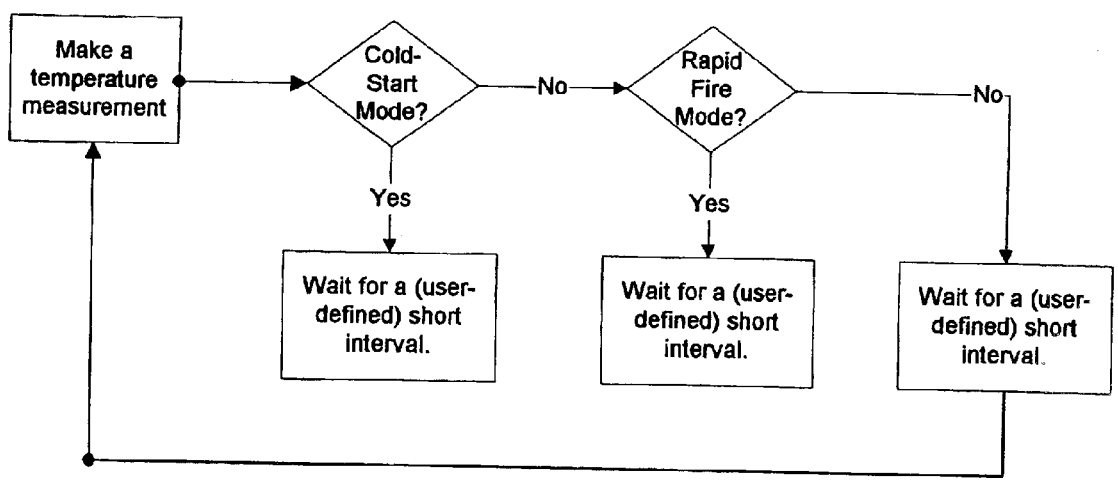
Figure 33:
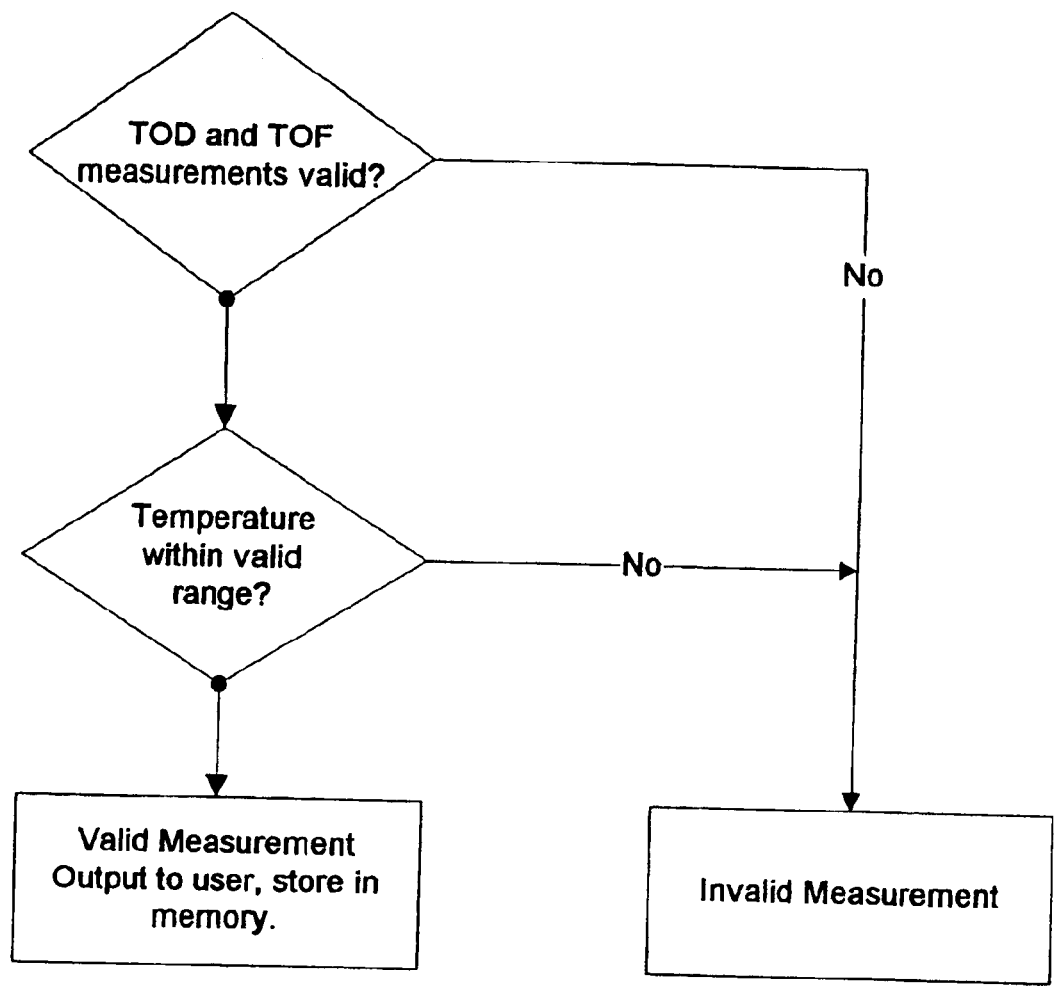

The signal processor 65, shown schematically in FIGS. 31–33, includes a time-of-departure module 145, a time-of-flight module 150, and a temperature calculation module 155. The time-of-departure module 145 locates the beginning of the acoustic signal from the acoustic signal generator, using a level-trigger algorithm. The beginning of the acoustic signal from the acoustic signal generator is defined as the first time the signal amplitude exceeds a selected percentage (e.g. 150%) of the maximum signal amplitude of the background noise received on the detector 57 for the acoustic signal generator. Instead of using the detector 57 and the tube 59 connecting the nozzle 70 to the detector 57 to detect the acoustic signal, a pressure sensor or detector such as a piezoelectric element, or an optical, magnetic, capacitive or other proximity sensor or detector could be mounted directly in the throat 90 or the output nozzle 70 of the acoustic signal generator 55 to detect the acoustic signal 56 or the movement of the piston 116 that releases a blast of air under pressure through the output nozzle to produce the desired electrical signal indicative of the initiation of the acoustic signal 56 from the signal generator 55.

The time-of-flight module 150 analyses the signal received by the receiver microphone 62 to facilitate differentiation between background noise and the acoustic signal so as to locate the beginning of the acoustic signal in the background noise. The time of flight module 150 includes a digital prefilter for modifying the signal received in the receiver to produce a modified signal having an increased ratio of the acoustic signal amplitude to the noise amplitude. The time-of-flight module also creates a stochastic model of the signal for determining the time of onset of the acoustic signal in the receiver.

The digital pre-filter includes a linear prediction error filter or linear whitening filter operating by an autocorrelation method that measures N consecutive samples of the signal amplitude from the receiver microphone, and predicts what the $N+1^{th}$ signal will be from the previous N samples. The predicted $N+1^{th}$ signal is then subtracted from the actual measured signal value. In the preferred embodiment, twelve signal samples are used to make the prediction about the thirteenth, although other sample sizes could be used. This linear prediction error filter process is performed on each sample, resulting in a small amplitude modified or filtered signal having more of the characteristics of the acoustic signal from the signal generator 55. The acoustic signal is more apparent in the modified or filtered signal. To identify the onset of the acoustic signal in the filtered signal, an accurate and reliable method is to form a stochastic model of the signal and use it to find the most likely location of the onset of the acoustic signal in the filtered signal.

The stochastic model preferred in this embodiment of the invention is a Markov model. It consists of two or more "states". Each state behaves like a stationary random variable that produces uncorrelated white Gaussian noise. The model can move from state to state as time progresses.

A Markov model with three states is assumed for the signal. The first state represents the background noise of the filtered signal without the acoustic signal imposed. The second state acts like the acoustic signal, and the third state models the filtered signal after the acoustic signal has ended.

Since each state produces uncorrelated white Gaussian noise, the only unknown parameters are the mean value of the output and its variance. The filtered signal is normalized to zero-mean as part of the pre-filtering process, so only the variance must be estimated.

The variance of the first and third states are assumed to be the same, and are estimated using only signal samples known to contain only background noise with the acoustic signal absent. Since the acoustic signal must arrive after it is generated by the acoustic signal generator, those samples that occur before the generation of the acoustic signal are used to estimate the variance in the first state. The variance of the samples from the second state is estimated from samples located directly around the sample with the sample with the maximum amplitude in the filtered signal.

The filtered signal from the receiver and the Markov model are used together with the Viterbi algorithm, a well known algorithm that labels each time index with a state. The transition between State One and State Two can be detected by determining the most probable time for the shift from State One to State Two, and indicates the arrival of the acoustic signal.

To improve the reliability of the system, a number of checks are made to ensure that the detected signal onset is physically reasonable and otherwise minimize the chances of indicating erroneous temperature measurements. The system listens for a period of relative quiet inside the boiler to take a measurement. The primary sources of noise inside the boiler of high enough amplitude to interfere with the operation of the acoustic pyrometer are the soot blowers. When the time arrives for the system to take a temperature measurement, the RMS value of the background noise as picked up by the receivers 60 is measured and no measurement is taken if the measured value exceeds a predetermined threshold, which can be selected for the particular boiler installation to produce the best combination of permissible measurement time and valid measurements. Then the time of arrival of the signals detected by the receivers 60 are compared to the time of generation of the signals in the signal generator. If the arrival time of the acoustic signal is found to lie in very close proximity to the beginning or end of the sampled interval, or if the amplitude of the signal is found to be small compared to the filtered background noise, the acoustic signal is determined to be invalid and is discarded. The temperature is evaluated to determine if it is in a reasonable temperature range (e.g. 0–3500° F.) and is discarded if outside that range. The system keeps track of the last several measured temperatures and compares the latest measured temperature with those. If it is outside a reasonable range of likely change (say, 300° F. in the normal measuring period of about two minutes) that measurement is presumed invalid and is discarded.

To produce a baseline temperature measurement at system start-up or after the expiration of a validation period, e.g. 60 minutes, in which no valid temperature measurements were taken, the system automatically performs a "cold start" procedure to produce a baseline temperature for validation checking, that is, against which subsequent measurements can be compared and discarded if they are outside the predetermined validation range. The cold start procedure is to produce a number of temperature measurements (e.g. 15) in rapid succession and average those measurements. The number is large enough to dilute the effect an erroneous measurement, but small enough that the baseline can be produced quickly. After the baseline temperature is established, it is continuously refined by discarding invalid measurements and comparing subsequent measurements only to the lest several valid measurements.

The temperature module calculates the temperature of the open space between the signal generator and the receiver. The path length through the open space is known, either by accurate measurement or by calculation based on signal transit time at a known temperature. The transit time of the acoustic signal from the signal generator to the receiver is a function of temperature, as expressed in the following algorithm, and the average gas temperature in the transit path through the open space across the boiler is readily calculated knowing the transit time and the path length.

$$C_s = \sqrt{\frac{\gamma RT}{M}}$$

Where:
$\gamma$=Ratio of specific heats
R=Universal Gas Constant
T=Temperature
M=Mean Molecular Weight of Gas
If path length=L, transit time=t, then $$C_s = \frac{L}{t}$$

In operation, the acoustic pyrometer measures the average gas temperature along a line 52 through the boiler or other open space of known dimension. An acoustic signal generator produces an acoustic signal with a high amplitude sudden onset. The signal is produced by a sudden release of air under high pressure from a front opening in a large cavity through a nozzle and into the open space. The process includes plugging the front opening by positioning a piston in the opening. The gas in the cavity is pressurized and, when the acoustic signal is to be created, the piston is accelerated to high speed in the opening prior to unplugging the opening so that the piston moves at high speed from a fully plugged position to a fully unplugged position and releases the pressurized air explosively from the cavity to the external space. The acceleration of the piston uses the same air pressure in the cavity, so no external power source is needed.

A detector in the signal generator receives the signal from the signal generator and generates a first electrical signal which indicates the time of generation of the acoustic signal by discharge of the signal generator. The first electrical signal is transmitted to the signal processor.

The acoustic signal propagates across a space of known distance in the boiler where it is received in a receiver which generates second electrical signals corresponding to amplitude and frequency of the acoustic signals in the receiver. The electrical signals from the receiver are processed in a signal processor to produce a distinct differentiation between background noise and the onset of the acoustic signal in the receiver. The time of the onset of the acoustic signal in the receiver is compared with the onset of the acoustic signal in the signal generator to determine the transit time of the acoustic signal to traverse the space. The temperature of the gas in the space is calculated based on the transit time of the acoustic signal across the open space from the signal generator to the receiver, as described above.

Figure 7:
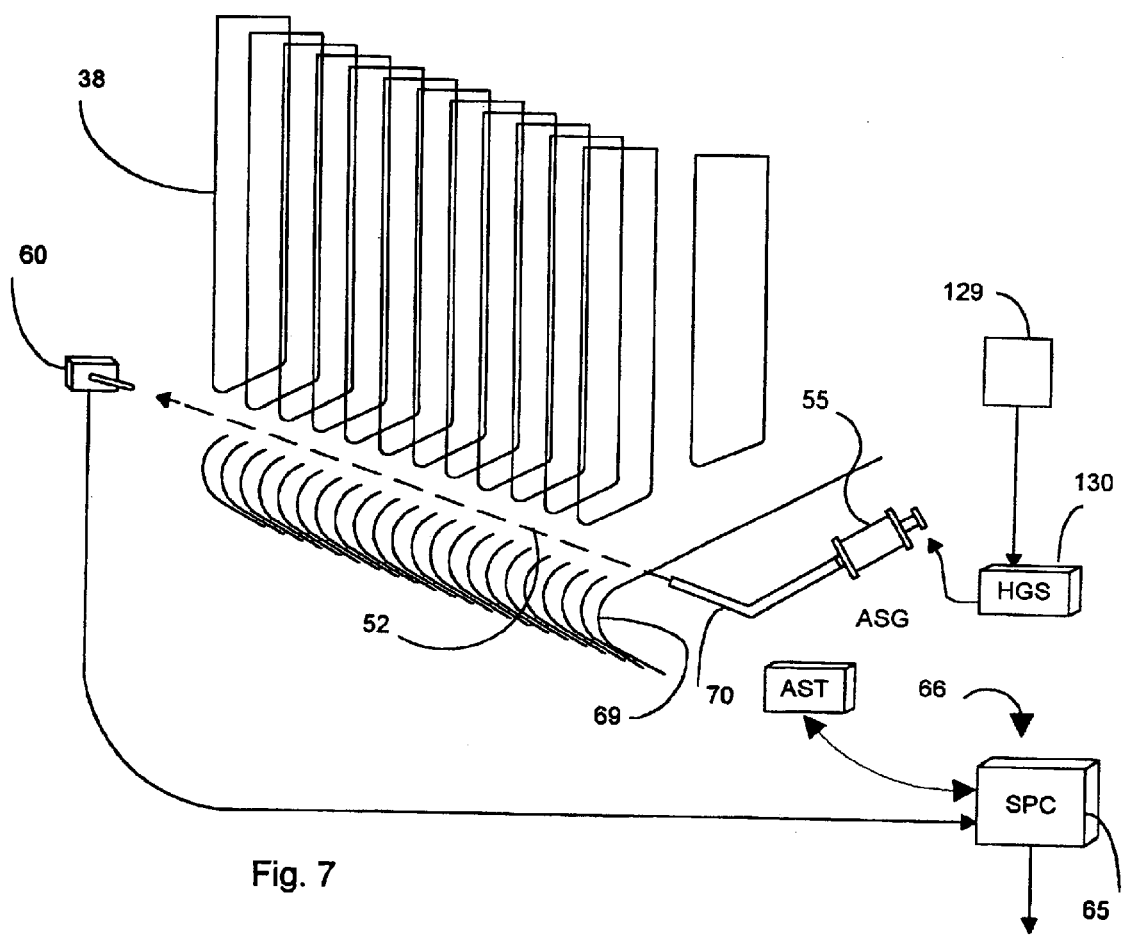
FIGS. 7 and 9 are schematic views of a boiler with an acoustic pyrometer of this invention mounted thereon.
Figure 8:
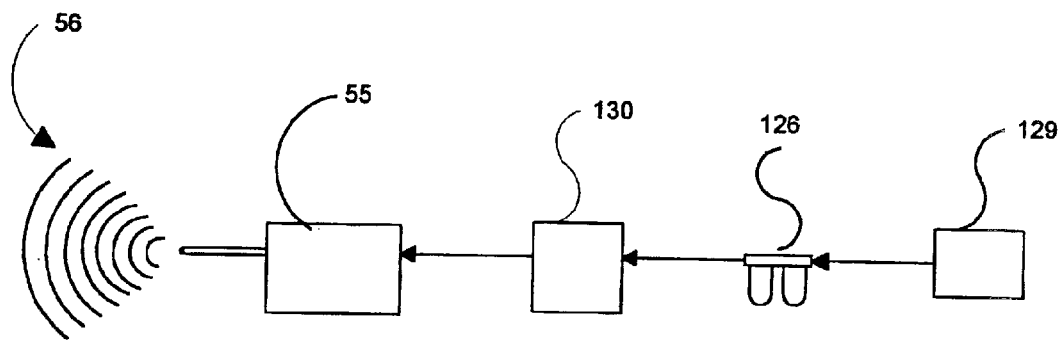
FIG. 8 is simplified schematic view of the air system for powering the acoustic pyrometer of this invention.

The signal generators and receivers can be placed in the boiler in numerous configurations to achieve temperature data of interest to the boiler operator. For example, a single signal generator 55 and a single receiver 60 can be placed opposite to each other as shown in FIG. 7 to obtain the average gas temperature along the line between the signal generator 55 and the receiver 60. Information about the temperature distribution in a plane can be obtained by several receivers 60 in that plane with a single generator 55 as shown in FIGS. 1, 2 and 9. A detailed thermal map can be produced using multiple signal generators 55 and receivers 60 arranged in the plane of interest, for example, in the furnace exit plane as shown in FIG. 22 using known tomography techniques to produce temperatures at points of intersection of the lines between the signal generators 55 actuated serially in rapid succession and the receivers 60.

Figure 6:
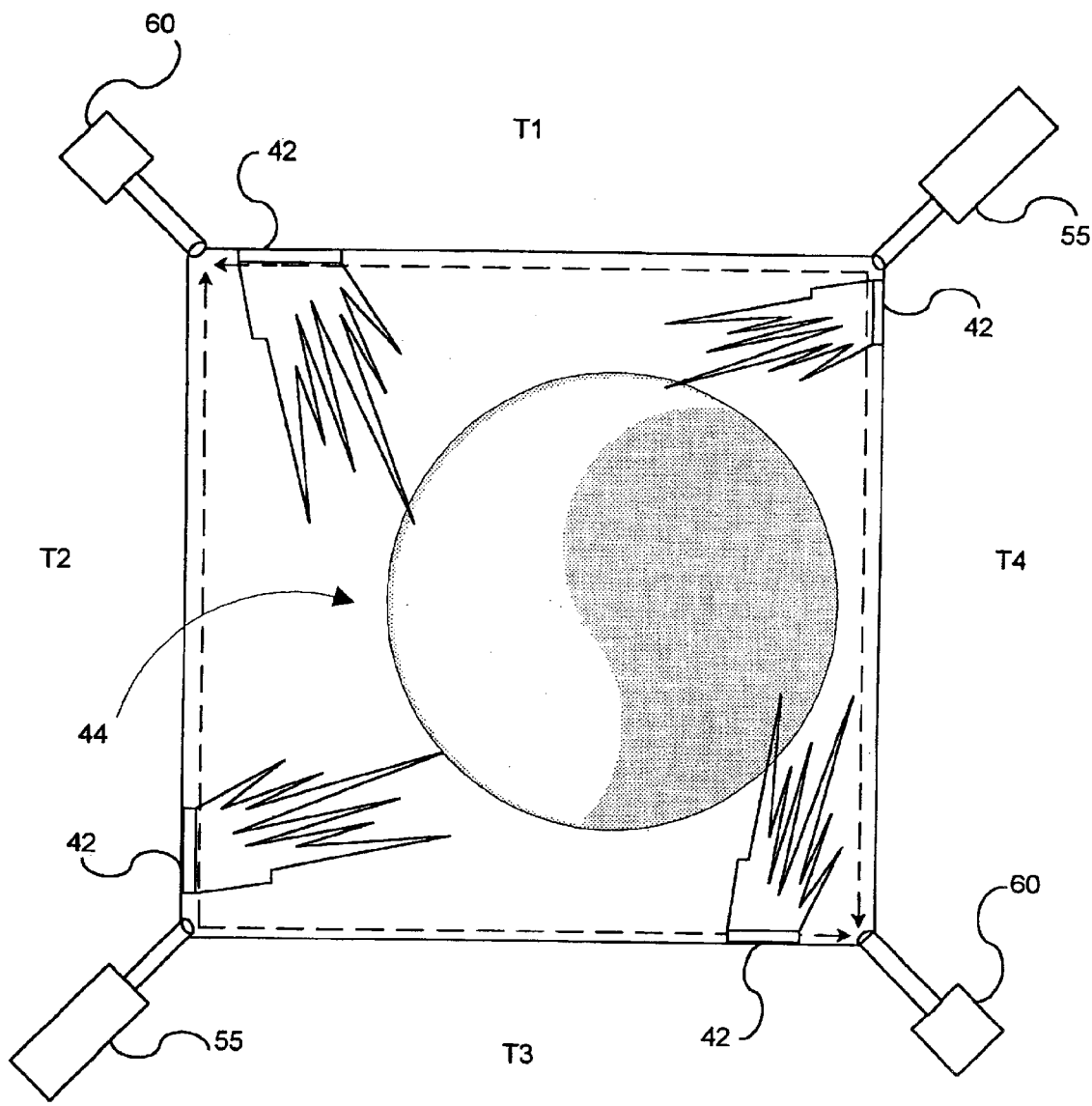
FIG. 6 is a schematic view of a fire box in a tangentially fired boiled.

Fireball centering can be achieved using two generators 55 and two receivers 60, as shown in FIG. 6. The signal generators 55 are actuated separately in rapid succession, and the signals received in the receivers 60 are analyzed to detect non-uniform temperatures along the sides T1–T4. As illustrated, the equal temperatures along T1 and T3, and the unequal temperatures along T2 and T4 indicate that the fireball 44 is aligned equally between T1 and T3 walls, but is shifted away from the T2 wall toward the T4 wall. The orientation of the burners 42 can then be adjusted to shift the fireball toward the center of the firebox. Likewise, firewall impingement shown in FIGS. 23 and 24 can be detected using suitably placed signal generators 55 and receivers 60 (only one pair of which is shown).

In FIG. 25, vertical distribution of temperature above the furnace can be obtained using a single signal generator and vertically spaced receivers 60. This temperature distribution can give an indication of dwell times above the critical temperature of 2700° F. at which thermal $NO_x$ formation markedly increases. This temperature information gives the boiler operator an early warning and an opportunity to adjust the burners in the furnace to reduce the temperature to a safe level.

Figure 36:
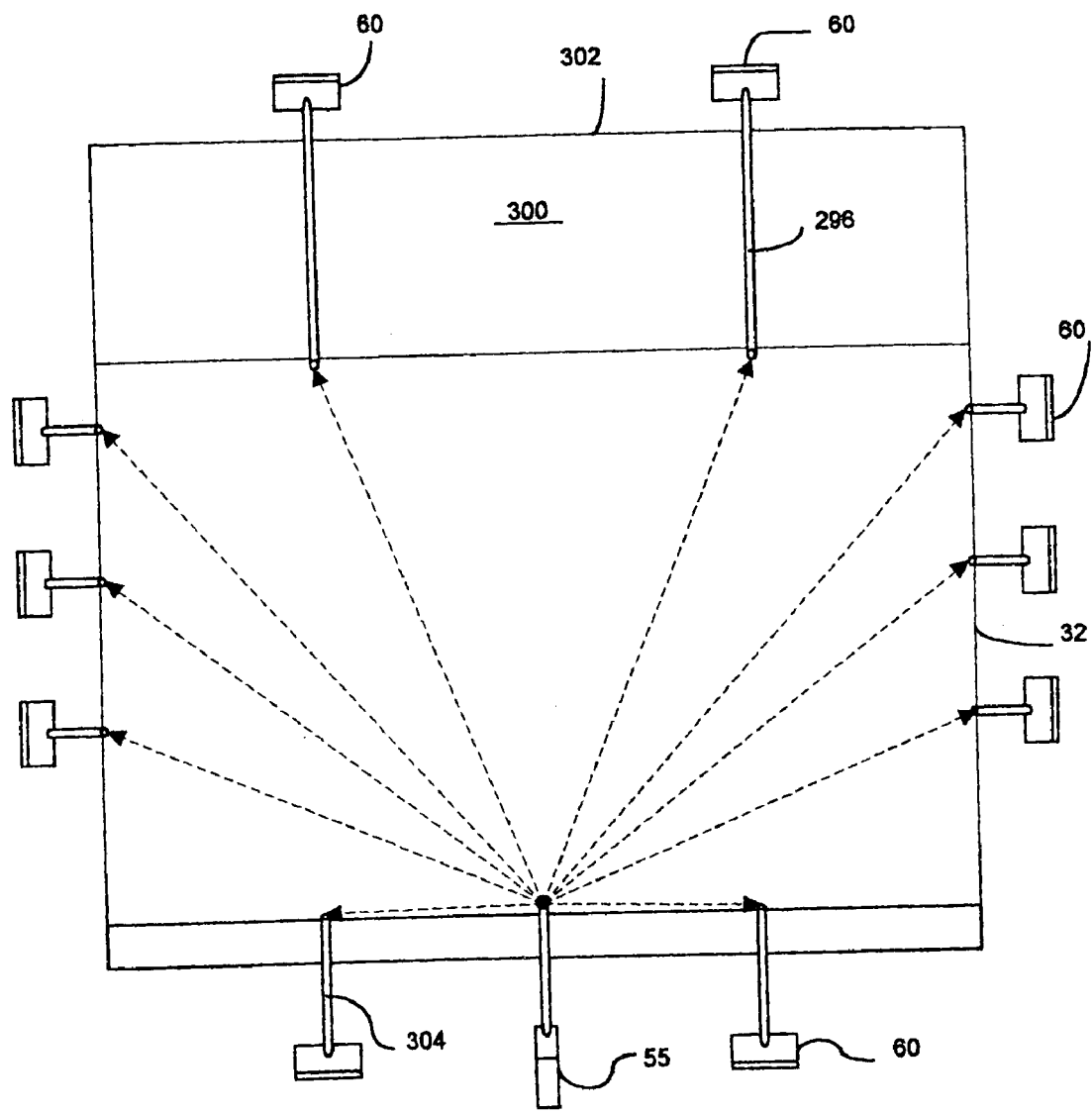

By installing the signal generator 55 through the boiler nose tube wall 69 as shown in FIGS. 34–36, a multitude of important gas temperatures can be measured. The generator 55 is fitted with a long barrel 71 so that the signal generator body can be placed outside the interior wall 294 in the boiler nose, shown in FIG. 35, to isolate the signal generator from the hot interior chamber behind the boiler nose 69. The receivers 60 are placed in the side tube walls 32 and, as shown in FIG. 36, at the ends of cable drop tubes 296 that extend through the top tube wall 298, through the "penthouse" space 300 and through the top wall 302 of the boiler. This arrangement of the receivers 60 protects them from excessive temperatures inside the "penthouse" 300 and produces valuable temperature data about the entrance plane into the pendant tube banks.

The bull nose 69 can provide useful access to receiver tubes 304, as shown in FIGS. 37 and 38, for receiving signals from signal generators 55 mounted outside the boiler side tube walls 32 and conducting the acoustic signal through the tube 304 to a receiver 60 mounted on the cool side of a partition 306 across the bull nose 69, as shown in FIG. 37, or a signal generator 55 in the bull nose 69, as shown in FIG. 36.

Obviously, numerous modifications and variations of the preferred embodiment described above are possible and will become apparent to those skilled in the art in light of this specification. For example, many functions and advantages are described for the preferred embodiment, but in some uses of the invention, not all of these functions and advantages would be needed. Therefore, we contemplate the use of the invention using fewer than the complete set of noted functions and advantages. Moreover, several species and embodiments of the invention are disclosed herein, but not all are specifically claimed, although all are covered by generic claims. Nevertheless, it is our intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, are to be considered within the spirit and scope of the invention as defined in the following claims, wherein we claim:

What is claimed is:

1. An acoustic signal generator for generating an acoutic signal with a high amplitude, sudden onset, comprising:

a main cylinder having front and rear opposed ends and an axial opening in each end;

a partition in an intermediate portion of said cylinder dividing said cylinder into front and rear chambers, and an axial opening in said partition communicating between said chambers;

a rear cylinder attached to said rear cylinder end around said rear axial opening and communicating therethrough with said rear chamber;

a piston assembly having an intermediate piston in said rear chamber, and a rear piston in said rear cylinder;

a seal assembly connected to said piston assembly and movable herewith, said seal assembly having a front plug and a front seal coacting with said front plug to seal said front end axial opening, and an intermediate seal plugging said axial opening in said partition;

said front seal is mounted on said front plug and is normally disposed on said front plug in a bore forming part of said front axial opening and is movable axially with said front plug;

a pneumatic operating system for charging said rear chamber of said main cylinder with gas at a first high pressure and for charging said rear cylinder with gas at a second high pressure, said pneumatic operating system including a coupling for connection to a source of gas pressure and a remotely operated vent to allow said pressurized gas in said rear cylinder to escape, thereby reducing forwardly directed forces on said intermediate piston in said rear chamber exerted by pressurize gas on said rear piston, below rearwardly directed forces exerted by pressurize gas in said forward chamber against said intermediate seal.

2. An acoustic signal generator as defined in claim 1, wherein:

said vent includes a restricted orifice through which gas is allowed to escape from said rear cylinder at a preselected slow rate;

whereby a gas cushion remains in said rear cylinder to decelerate said piston assembly and minimize damage to said piston assembly.

3. An acoustic signal generator as define in claim 1, wherein:

said front seal is of smaller diameter than said intermediate seal.

4. A method of generating an acoustic signal having a sharp, high amplitude onset, comprising:

plugging an opening into a cavity within a body by positioning a plug in said opening, said opening communicating through said body between said cavity and external space outside said cavity;

pressurizing gas in said cavity;

accelerating said plug to high speed prior to unplugging said opening; and unplugging said opening by moving said valve at high speed from fully plugged position to a fully unplugged position and releasing said pressurized gas suddenly from said cavity to said external space.

5. A method as defined in claim 4, wherein said valve accelerating step comprises:

opening a port between said cavity; and exerting elevated gas pressure suddenly against a large diameter piston connected to said valve.

6. A process of determining the arrival time of an acoustic signal propagated through a noisy environment and detected in a receiver, comprising:

digitally pre-filtering said acoustic signals received in said receiver to facilitate differentiation between background noise in said open space and said acoustic signal so as to locate the beginning of said acoustic signal in said background noise; said prefiltering includes, a) measuring N consecutive samples of said signal received in said receiver, b) predicting what an $N+1^{th}$ signal will be from the previous N samples, c) measuring said $N+1^{th}$ sample to obtain an actual measured value of said $N+1^{th}$ sample, d) subtracting said predicted $N+1^{th}$ signal from said actual measured $N+1^{th}$ signal value; and, e) repeating steps a)–d) with each new sample taken to produce a small amplitude modified signal having more characteristics of said acoustic signal from said signal generator;

forming a stochastic model having two or more states, each state behaving like a stationary random variable that produces uncorrelated white Gaussian noise, said model able to move from state to state as time progresses, said model having a first state representing said background noise of said filtered signal without said acoustic signal imposed, and a second state acting like said acoustic signal; normalizing said filtered signal to zero-mean as part of said pre-filtering process; estimating the statistical variance of the samples from said first state using signal samples known to contain only background noise with said acoustic signal absent, using samples that occur before generation of said acoustic signal by said acoustic signal generator; estimating the statistical variance of samples from said second state from samples located directly around said sample with maximum amplitude in the filtered signal; and determining the most probable time for the shift from said first state to said second state, and the most probable time for the arrival of said acoustic signal, by labeling each time index with a state using said filtered signal from said receiver and said stochastic.

7. A method of centering a fireball in a boiler furnace, comprising:

separately actuating in rapid succession two signal generators placed in opposite sides of a fire box, and receiving signal produced by said signal generators in two receivers positioned opposite each other and on a plane transverse to a plane through both said signal generators;

analyzing signals received in said receivers to detect non-uniform temperatures along sides of said firebox;

adjusting the orientation of burners in said firebox to shift the fireball toward the center of the firebox.

* * * * *